US012712667B2

(12) United States Patent
Pick et al.

(10) Patent No.: US 12,712,667 B2
(45) Date of Patent: Aug. 18, 2026

(54) DYNAMIC PRG SIZE PRECODING

(71) Applicant: QUALCOMM Incorporated, San Diego, CA (US)

(72) Inventors: Jacob Pick, Mevaseret Zion (IL); Shay Landis, Hod Hasharon (IL); Peer Berger, Hod Hasharon (IL); Amit Bar-Or Tillinger, Tel-Aviv (IL); Tomer Geva, Kiryat Ono (IL)

(73) Assignee: QUALCOMM Incorporated, San Diego, CA (US)

( * ) Notice: Subject to any disclaimer, the term of this patent is extended or adjusted under 35 U.S.C. 154(b) by 287 days.

(21) Appl. No.: 18/584,956

(22) Filed: Feb. 22, 2024

(65) Prior Publication Data

US 2025/0274219 A1 Aug. 28, 2025

(51) Int. Cl.

| | |
|---|---|
| ***H04L 1/00*** | (2006.01) |
| ***H04L 27/26*** | (2006.01) |
| ***H04W 8/22*** | (2009.01) |
| ***H04W 72/21*** | (2023.01) |
| ***H04W 72/232*** | (2023.01) |

(52) U.S. Cl.

CPC ........ *H04L 1/0064* (2013.01); *H04L 27/2605* (2013.01); *H04W 8/22* (2013.01); *H04W 72/21* (2023.01); *H04W 72/232* (2023.01)

(58) Field of Classification Search

None

See application file for complete search history.

(56) References Cited

U.S. PATENT DOCUMENTS

| | | | | |
|---|---|---|---|---|
| 10,298,359 | B2 * | 5/2019 | Yi | H04W 4/70 |
| 10,944,462 | B2 * | 3/2021 | Li | H04B 7/0456 |
| 2019/0253220 | A1 * | 8/2019 | Kim | H04B 7/0695 |
| 2020/0145974 | A1 * | 5/2020 | Rico Alvarino | H04L 5/0007 |
| 2023/0042806 | A1 * | 2/2023 | Frenne | H04L 5/0023 |

* cited by examiner

*Primary Examiner* — Hong S Cho

(74) *Attorney, Agent, or Firm* — Procopio, Cory, Hargreaves & Savitch LLP

(57) ABSTRACT

A method for wireless communication at UE and related apparatus are provided. In the method, the UE groups a set of RBs of a slot into multiple PRGs having multiple PRG sizes; and communicates with a network entity based on multiple precoding matrices respectively associated with the multiple PRGs having the multiple PRG sizes. The UE performs a precoding procedure based on the multiple PRG sizes to obtain the multiple precoding matrices, and each precoding matrix of the multiple precoding matrices is based on a concatenated channel matrix based on a corresponding PRG size of the multiple PRG sizes.

30 Claims, 12 Drawing Sheets

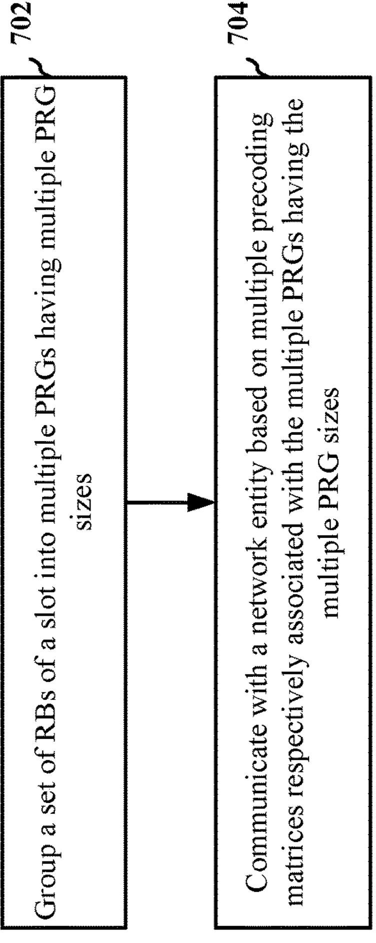
FIG. 7

Figure 8:
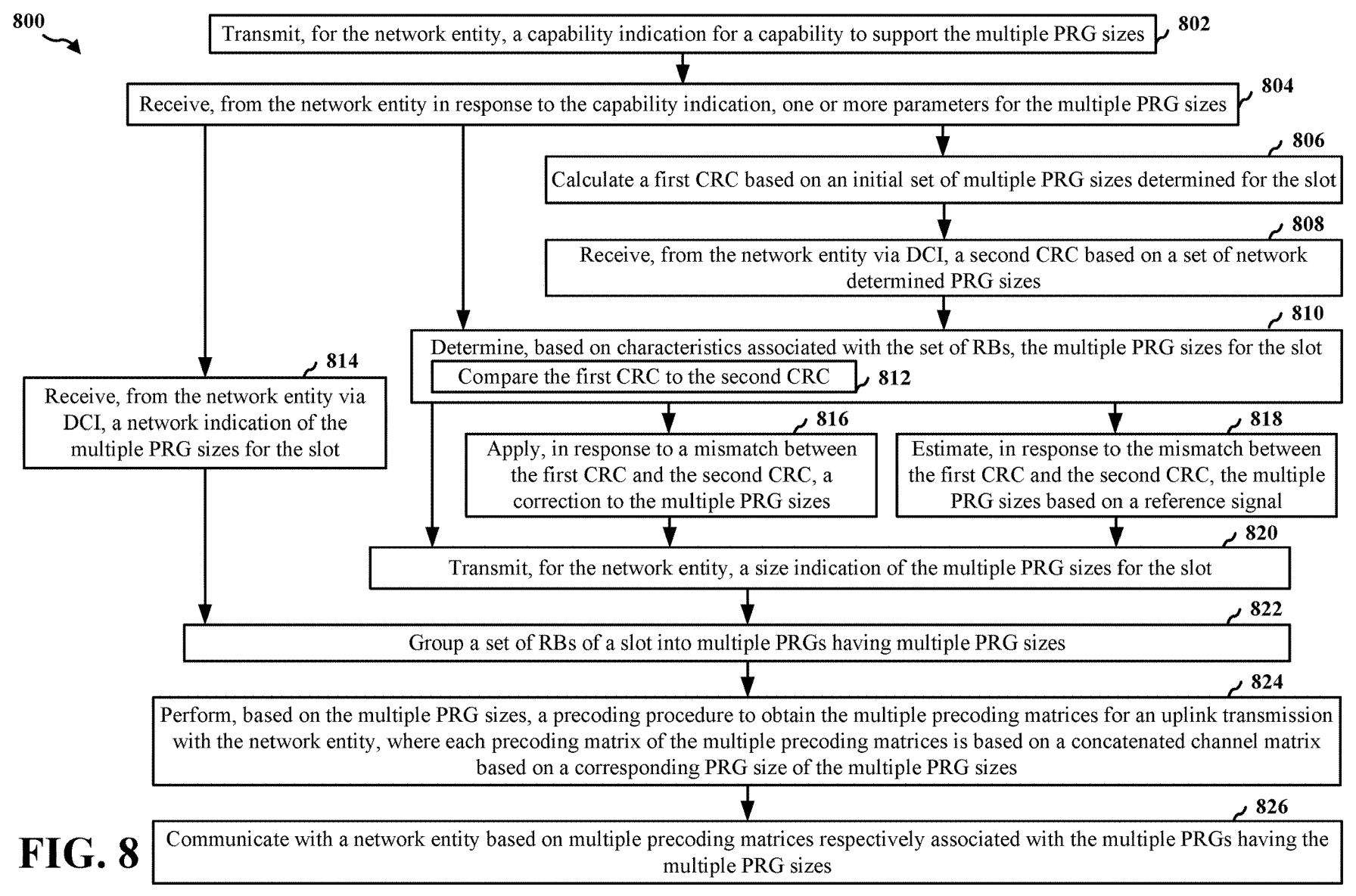

800

802 Transmit, for the network entity, a capability indication for a capability to support the multiple PRG sizes 804 Receive, from the network entity in response to the capability indication, one or more parameters for the multiple PRG sizes 806 Calculate a first CRC based on an initial set of multiple PRG sizes determined for the slot 808 Receive, from the network entity via DCI, a second CRC based on a set of network determined PRG sizes 810 Determine, based on characteristics associated with the set of RBs, the multiple PRG sizes for the slot 812 Compare the first CRC to the second CRC 816 Apply, in response to a mismatch between the first CRC and the second CRC, a correction to the multiple PRG sizes 818 Estimate, in response to the mismatch between the first CRC and the second CRC, the multiple PRG sizes based on a reference signal 814 Receive, from the network entity via DCI, a network indication of the multiple PRG sizes for the slot 820 Transmit, for the network entity, a size indication of the multiple PRG sizes for the slot 822 Group a set of RBs of a slot into multiple PRGs having multiple PRG sizes 824 Perform, based on the multiple PRG sizes, a precoding procedure to obtain the multiple precoding matrices for an uplink transmission with the network entity, where each precoding matrix of the multiple precoding matrices is based on a concatenated channel matrix based on a corresponding PRG size of the multiple PRG sizes 826 Communicate with a network entity based on multiple precoding matrices respectively associated with the multiple PRGs having the multiple PRG sizes

DYNAMIC PRG SIZE PRECODING

TECHNICAL FIELD

The present disclosure relates generally to communication systems and, more particularly, to wireless communication including precoding based on physical resource block group (PRG) sizes for wireless communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus may include at least one memory and at least one processor coupled to the at least one memory. Based at least in part on information stored in the at least one memory, the at least one processor, individually or in any combination, may be configured to group a set of resource blocks (RBs) of a slot into multiple physical resource block groups (PRGs) having multiple PRG sizes; and communicate with a network entity based on multiple precoding matrices respectively associated with the multiple PRGs having the multiple PRG sizes.

In an aspect of the disclosure, a method, a computer-readable medium, and an apparatus are provided for wireless communication at a network entity. The apparatus may include at least one memory and at least one processor coupled to the at least one memory. Based at least in part on information stored in the at least one memory, the at least one processor, individually or in any combination, may be configured to group a set of RBs of a slot into multiple PRGs having multiple PRG sizes; and communicate with a UE based on multiple precoding matrices respectively associated with the multiple PRGs.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 7 is a flowchart illustrating methods of wireless communication at a UE in accordance with various aspects of the present disclosure.

FIG. 8 is a flowchart illustrating methods of wireless communication at a UE in accordance with various aspects of the present disclosure.

DETAILED DESCRIPTION

Figure 1:
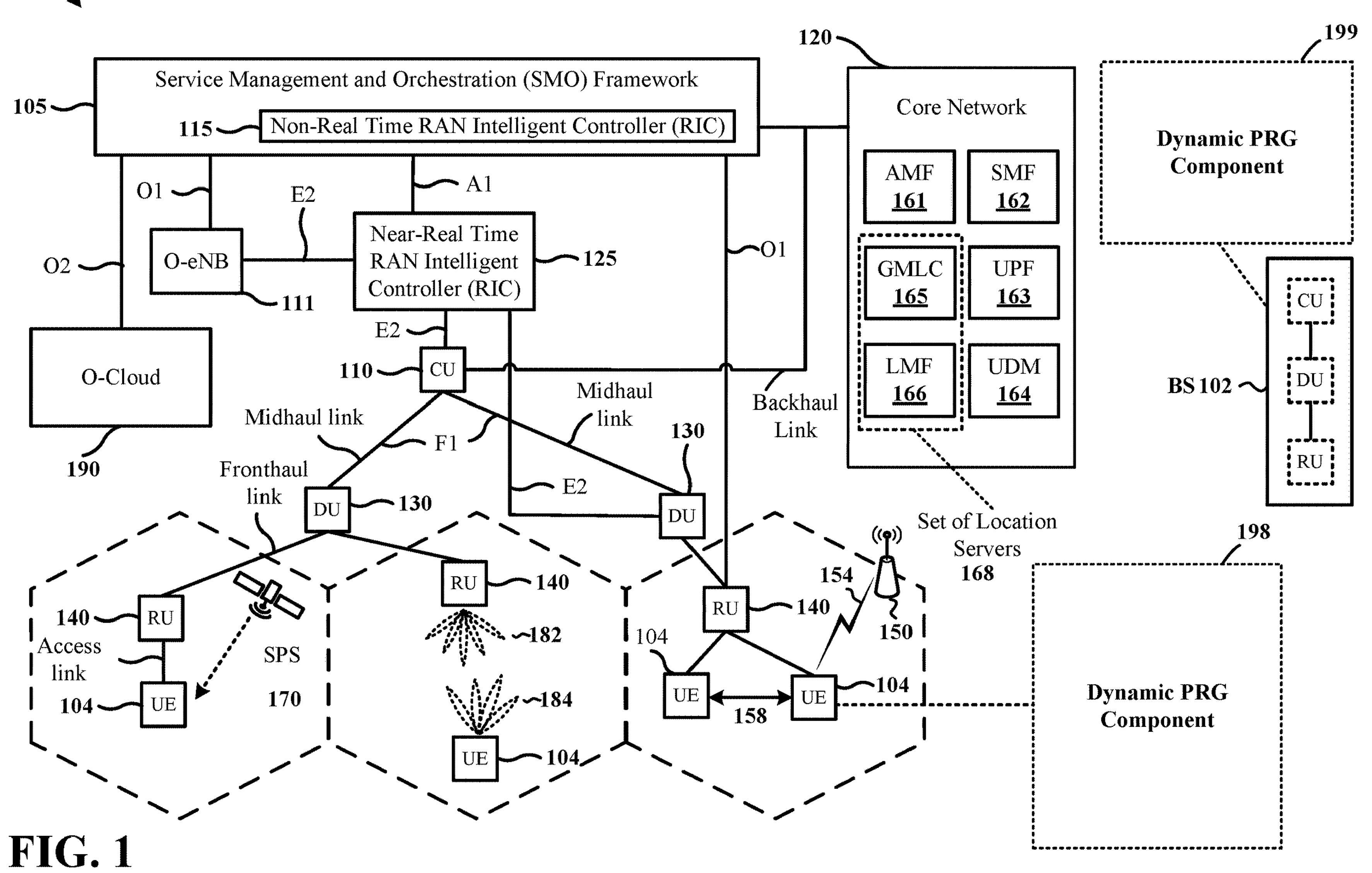
FIG. 1 is a diagram illustrating an example of a wireless communication system and an access network.

In wireless communication, resource blocks (RBs) may be grouped into a physical resource block group (PRG). The UE may assume the same precoding is applied for any downlink contiguous allocation of physical resource blocks (PRBs) in a PRG. The PRG size (e.g., the number of RBs within a PRG) may be constant across the frequency range of wireless communication. However, the fixed PRG size may not adequately accommodate the diverse conditions of wireless communication. For example, smaller PRG sizes may be beneficial for precisely tracking channel variations over frequency, especially in scenarios with fast-changing channels. On the other hand, larger PRG sizes may help to mitigate edge effects that can affect channel estimation accuracy. A variable PRG size is presented herein that balances the varied conditions that may occur in dynamic wireless communication environments. Example aspects presented herein provide methods and apparatus for dynamically adjusting the PRG size based on actual channel conditions, which improves the adaptability and efficiency of wireless communication.

Various aspects relate generally to wireless communication. Some aspects more specifically relate to the dynamic adjustment of PRG sizes for wireless communication. In some examples, a user equipment (UE) groups a set of RBs of a slot into multiple PRGs having multiple PRG sizes; and communicates with a network entity based on multiple precoding matrices respectively associated with the multiple PRGs having multiple PRG sizes. In some examples, the UE performs a precoding procedure based on the multiple PRG sizes to obtain the multiple precoding matrices for an uplink transmission to the network entity. Each precoding matrix of the multiple precoding matrices may be based on a concatenated channel matrix based on a corresponding PRG size of the multiple PRG sizes. In some examples, the network entity may group a set of RBs of a slot into multiple PRGs having multiple PRG sizes; and communicate with the UE based on multiple precoding matrices respectively associated with the multiple PRGs. The network entity may perform a precoding procedure to obtain multiple precoding matrices for a downlink transmission with the UE based on the multiple PRG sizes. In some examples, the UE may recommend the precoding matrices for the downlink transmission (e.g., from a predefined codebook) at a channel state information feedback (CSF) report to the network entity.

Particular aspects of the subject matter described in this disclosure can be implemented to realize one or more of the following potential advantages. In some examples, by enabling dynamic PRG sizes adaptable to, for example, the channel frequency coherence, the described techniques may be used to more accurately track channel variations and reduce edge effects that degrade channel estimation accuracy, leading to improved performance in wireless communication. In some examples, by employing the precoding based on dynamic PRG sizes, the described techniques improve the channel capacity and ensure that the precoding matrix accurately captures the channel's characteristics across the entire frequency range.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a dynamic PRG component 198. The dynamic PRG component 198 may be configured to group a set of RBs of a slot into multiple PRGs having multiple PRG sizes; and communicate with a network entity based on multiple precoding matrices respectively associated with the multiple PRGs having the multiple PRG sizes. In certain aspects, the base station 102 may include the dynamic PRG component 199. The dynamic PRG component 199 may be configured to group a set of RBs of a slot into multiple PRGs having multiple PRG sizes; and communicate with a UE based on multiple precoding matrices respectively associated with the multiple PRGs. Although the following description may be focused on 5G NR, the concepts described herein may be applicable to other similar areas, such as LTE, LTE-A, CDMA, GSM, and other wireless technologies.

Figures 2A, 2B, 2C, 2D:
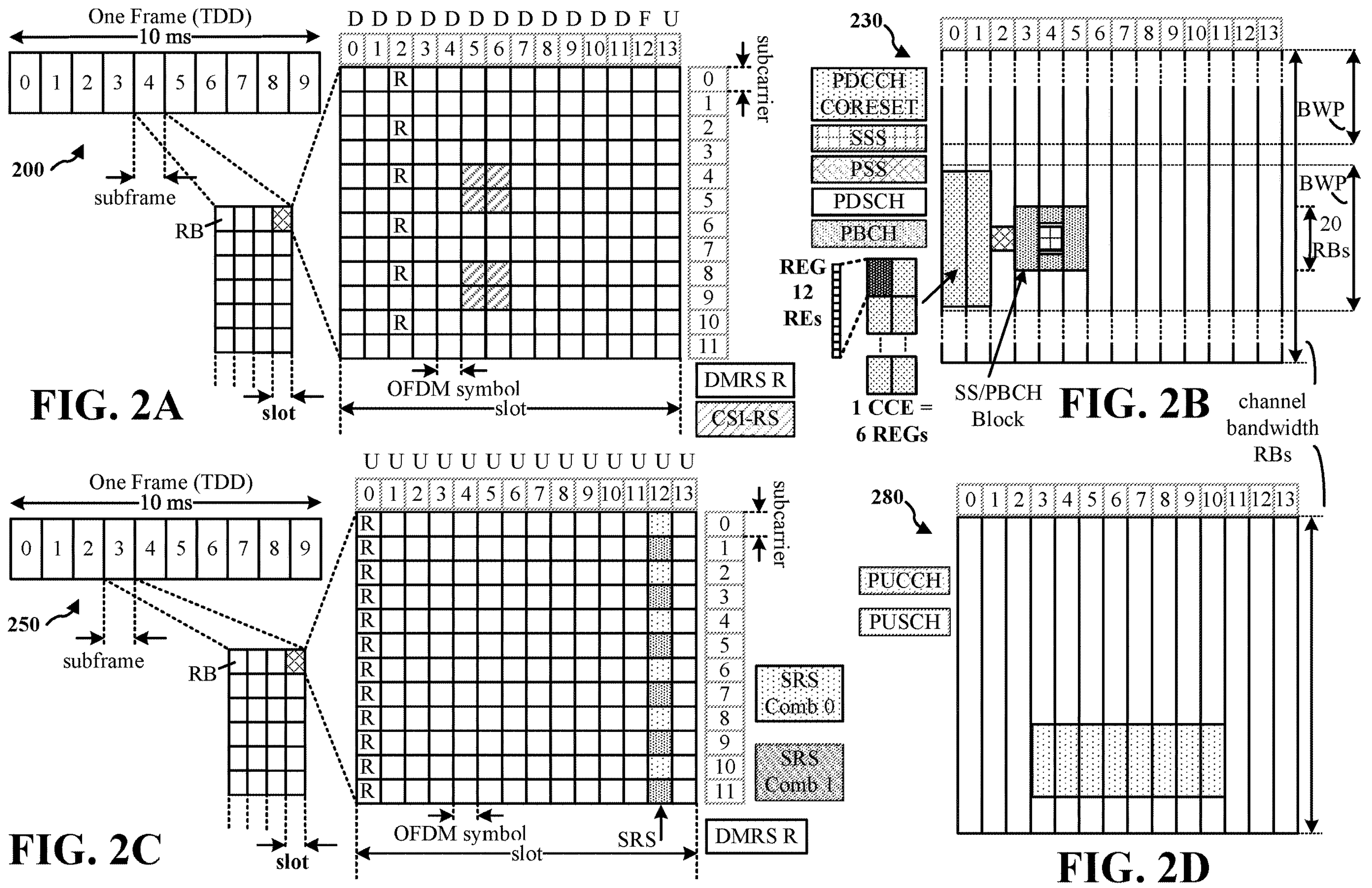
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
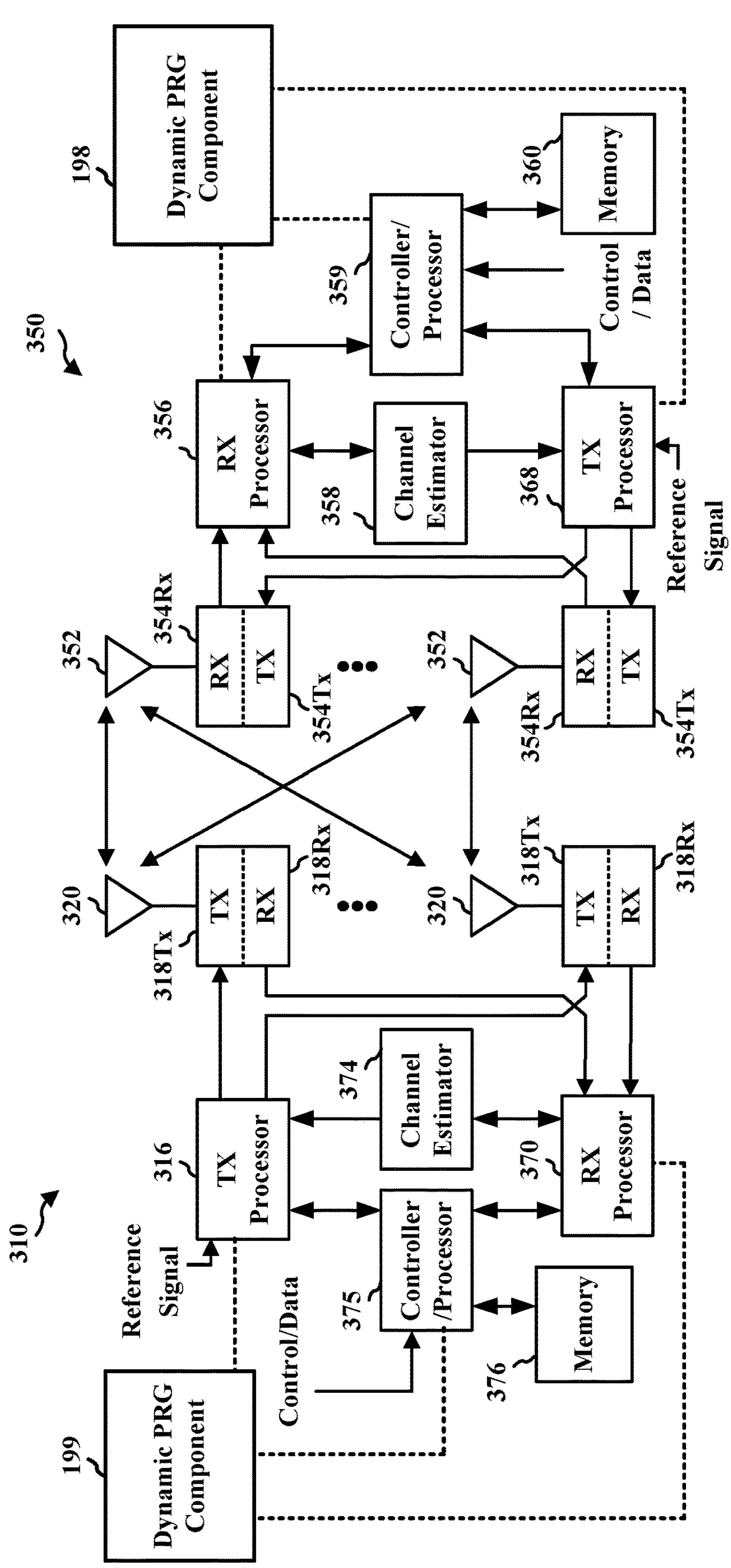
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the dynamic PRG component 198 of FIG. 1.

At least one of the TX processor 316, the RX processor 370, and the controller/processor 375 may be configured to perform aspects in connection with the dynamic PRG component 199 of FIG. 1.

Example aspects presented herein provide methods and apparatus for dynamic PRG size optimization based on, for example, the channel frequency selective coherency, which may be implemented by signaling from the network (e.g., a base station) to the UE, signaling from the UE to the network (e.g., a base station) and/or implicit agreement or determination based on channel reciprocity.

In wireless communication, a physical resource block group (PRG) may include multiple resource blocks (RBs) across the frequency range that are subject to the same precoding. Each PRG may include one or more RB, and the UE may assume the same precoding is applied for any downlink contiguous allocation of PRBs in a PRG. For example, the UE may assume that a precoding granularity in a bandwidth part is based on the PRG. The PRG partitions the bandwidth part into sets of consecutive PRBs. The same precoding may be applied for a contiguous allocation of PRBs in a PRG, for example. As an example, the UE may receive a transmission, such as a physical downlink shared channel (PDSCH) transmission having the same precoding applied for PRBs that are grouped in a PRG. The determination of PRG size may be based on various different factors. For example, smaller PRG sizes may more accurately track the channel variations over the frequency range, particularly in scenarios where the channel frequency coherence is low (e.g., when there are rapid channel variations over frequency). On the other hand, larger PRG sizes may help to mitigate the UE channel estimation edge effects that can degrade channel estimation accuracy. Hence, a fixed PRG size may not adequately accommodate the diverse conditions of wireless communication.

Example aspects presented herein provide methods and apparatus for dynamically adjusting the PRG size based on actual channel conditions, significantly improving wireless communication's adaptability and efficiency. In some aspects, the dynamic PRG sizing may be aligned with channel frequency coherence (e.g., the consistency of the channel's characteristics over a given frequency range). For example, larger PRGs may be allocated for sections of the channel exhibiting higher frequency coherence (e.g., similar channel characteristics), while smaller PRGs may be allocated for sections with smaller frequency coherence (e.g., varying channel characteristics). Based on a precoding procedure adapted to the dynamically adjusted PRG size, the adaptability and efficiency of wireless communication may be significantly improved. For example, the PRG size may vary over the channel frequency and may be referred to as a variable PRG size. This allows for precoding based on different sizes of PRGs along a bandwidth.

This dynamic PRG sizing may be determined in various ways. In one configuration, the network (e.g., a base station) may indicate PRG sizes for a slot to the UE. For example, the network may report the determined PRG sizes for each slot to the UE via the DCI. In some aspects, the DCI may be associated with a PDSCH transmission that the UE receives using the indicated PRG sizes. In another configuration, both the UE and the network (e.g., a base station) may use information about the channel used for precoding and may independently calculate the frequency coherence to determine PRG sizes. In some aspects, the UE and the network may use a defined method or rule to determine PRG sizes based on channel information. Then, the UE and the network (e.g., a base station) may simultaneously determine the PRG size based on common rules. For example, the UE and the network (e.g., a base station) may calculate their respective PRG sizes, and the final PRG size may be determined through a comparison or combination of the PRG sizes from the UE and the network. In another configuration, the UE may calculate the PRG size (e.g., based on the characteristics of the RBs over the frequency range) and then send an indication of the calculated PRG size to the network (e.g., a base station).

Figure 4:
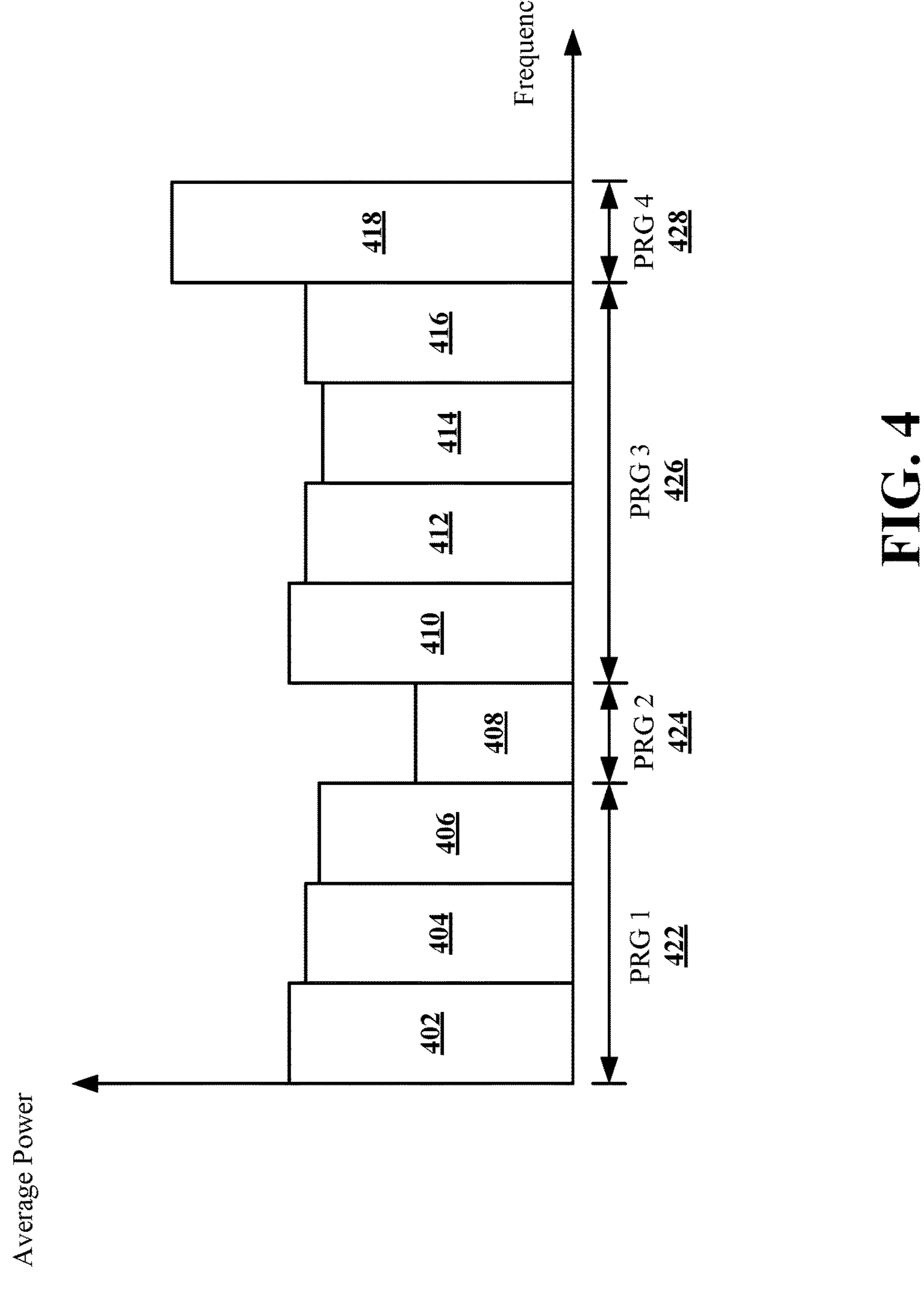
FIG. 4 is a diagram illustrating an example of dynamic PRG size determination in accordance with various aspects of the present disclosure.

In some aspects, the determination of the dynamic PRG sizes may be made by the UE, the network, or a combination of both based on the channel frequency coherency, such as the characteristics of the RBs over the frequency range. FIG. 4 is a diagram 400 illustrating an example of dynamic PRG size determination in accordance with various aspects of the present disclosure. In the example of FIG. 4, to determine the dynamic PRG size, the RBs over the frequency range may be grouped into one or more RB units (also referred to as RB raw groups), each including one or more RBs. For example, in FIG. 4, the RBs over the frequency range are grouped into nine RB units (e.g., RB units 402, 404, 406, 408, 410, 412, 414, 416, 418). Each RB unit (or RB raw group) may include a fixed number of RBs (e.g., four RBs). Then, using the estimation of the channel, the average power for each of the RB units (e.g., RB units 402, 404, 406, 408, 410, 412, 414, 416, 418) may be computed. The average power for an RB unit may be referred to as raw group power for the RB unit. The calculated average power for each RB unit may be averaged over all the orthogonal frequency division multiplexing (OFDM) symbols that contain demodulation reference signals (DMRS), and the RB units (or RB raw groups) may be grouped into one or more RB groups via an iterative procedure. This method segments the RBs over the frequency range into RB groups based on their average power with a resolution of the RB unit (e.g., four RBs). For example, referring to FIG. 4, the procedure may start from an RB unit at the edge of the frequency range (e.g., RB unit 402), which may be designated as a current RB group. If the power difference between the current RB group and the next RB unit (or RB raw group) is less than a specified threshold (e.g., $T_{add}$ dB), the next RB unit (or RB raw group) may be added to the current RB group, and the average power for the current RB group may be updated accordingly. For example, assuming the power difference between RB unit 402 and the next RB unit 404 is less than the threshold (e.g., $T_{add}$ dB), the next RB unit 404 will be added to the current RB group, and the average power for the current RB group (including RB units 402 and 404) may be updated accordingly.

On the other hand, if the power difference exceeds the threshold (e.g., $T_{add}$ dB), the current RB group is finalized as a PRG, and a new RB group may start from the next RB unit (or RB raw group). For example, assuming the power difference between a current RB group that includes RB units 402, 404, and 406 and the RB unit 408 is greater than the threshold (e.g., $T_{add}$ dB), the current RB group (including RB units 402, 404, and 406) will finalize as a PRG (e.g., PRG 1 422), and the new current RB group will start from RB unit 408. The method may be performed over all the RB units over the frequency range and group the RB units into multiple RB groups (or PRGs). For example, in FIG. 4, the RB units (e.g., RB units 402, 404, 406, 408, 410, 412, 414, 416, 418) are grouped into four PRGs (e.g., PRG 1 422, PRG 2 424, PRG 3 426, and PRG 4 428). The dynamic PRG sizes may be set based on the sizes of these RB groups (or PRGs). For example, the PRG sizes in the example of FIG. 4 may correspond to the sizes of the RB groups (or PRGs), which are three RB units (for PRG 1 422), one RB unit (for PRG 2 424), four RB units (for PRG 3 426), and one RB unit (for PRG 4 428).

In some aspects, when both the network (e.g., a base station) and the UE simultaneously calculate the PRG size, they may communicate the calculated PRG size with each other to ensure synchronization and accuracy in these sizes. In some examples, both the network (e.g., a base station) and the UE may convert the calculated PRG sizes into a bitstream, with each PRG size represented according to a predefined resolution and allocated a specific number of bits. In some examples, the resolution may be set at four RBs, and the number of bits for each PRG size may be set at 3. For example, with these settings, the PRG sizes of 4, 4, 16, 32, and 8 RBs may be represented by a stream of bits of 000, 000, 011, 111, 001. This stream of bits may then be encoded using a predetermined code, such as Reed Solomon, and a cyclic redundancy check (CRC) may be calculated with a predefined length to ensure data integrity.

In some examples, the network (e.g., a base station) may incorporate the CRC into the downlink control information (DCI) and transmit the DCI to the UE. The UE may compare the CRC it receives in the DCI against its own calculated CRC to confirm if the dynamic PRG sizes provided by the network match what it calculates. A match between these CRCs may indicate a high probability that the network (e.g., a base station) and UE have synchronized their PRG size calculations accurately. On the other hand, if there is a mismatch between these CRCs, in some examples, the UE may apply correction measures within the code's error correction capabilities to reconcile the difference between the CRCs. In some examples, if there is a mismatch between these CRCs, the UE may perform an estimation of the PRG size based on a received reference signal, such as a demodulation reference signal (DMRS).

In some aspects, the precoding procedure may be adjusted based on the dynamic PRG sizes for improved efficiency in wireless communication. The precoding procedure is described below using the singular value decomposition (SVD) precoding as an example, while the approach is applicable to various other channel-based precoding methods.

In some examples, for the PRG length $N_{PRG}$, a bin index $$k = \left\lfloor \frac{N_{PRG}}{2} \right\rfloor$$

from the start of the PRG length may be selected, and the SVD of the channel matrix at this bin (e.g., H(k)) may be calculated by:

$$U_{[N_{RX},N_{RX}]} D_{[N_{RX},N_{TX}]} V^{+}_{1[N_{TX},N_{TX}]} = H(k)_{[N_{RX},N_{TX}]} \quad (1)$$

where U and $V_1$ represent the matrices of left and right singular vectors, respectively, and D is the diagonal matrix of singular values.

The precoding matrix $P_1$ then may be derived from the first $N_L$ columns of $V_1$ based on:

$$P_1 = V_{1[N_{TX},N_L]}(1\colon N_L) \quad (2)$$

where $N_L$ corresponds to the number of transmission layers, and $N_{Tx}$ and $N_{Rx}$ denote the number of transmit and receive antennas, respectively.

Based on the dynamic PRG size, the precoding procedure may be adjusted by setting the concatenated channel of the PRG as $$\tilde{H}_{[N_{PRG}N_{RX},N_{TX}]},$$

which combines the channel matrices of all PRGs. That is, $$\tilde{H}_{[N_{PRG}N_{RX},N_{TX}]} = \begin{bmatrix} H(1) \\ \vdots \\ H(N_{PRG}) \end{bmatrix}_{[N_{PRG}N_{RX},N_{TX}]} \quad (3)$$

The SVD of this concatenated channel matrix $\tilde{H}$ then may be calculated based on:

$$U_{[N_{PRG}N_{RX},N_{PRG}N_{RX}]} D_{[N_{PRG}N_{RX},N_{TX}]} V^{+}_{2[N_{TX},N_{TX}]} = \tilde{H}_{[N_{PRG}N_{RX},N_{TX}]} \quad (4)$$

where U and $V_2$ represent the matrices of left and right singular vectors, respectively, and D is the diagonal matrix of singular values.

The precoding matrix $P_2$ may be derived from the first $N_L$ columns of $V_2$ based on $$P_2 = V_{2[N_{TX},N_L]}(1:N_L) \quad (5)$$

The SVD of the concatenated channel matrix $\tilde{H}$ in Equation (4) results in a new set of matrices U, D, and $V_2$, where the matrix $V_2$ now captures the eigenbasis of the entire PRG, rather than just some segments of the PRG. This approach allows the precoding matrix $P_2$ to utilize the entire spectrum of available channel information, enhancing the precoding efficiency and effectiveness, especially in scenarios with large delay spreads and PRG sizes. As an example, when simulated on a system configuration that includes an allocation of 96 RBs and a transmission setup that includes 16 transmit antennas, 4 layers, and 4 receive antennas, with the modulation and coding scheme (MCS) ranging from 20 to 27 and employing 256QAM MCS, a significant throughput gain of approximately 1.5 to 2 dB may be achieved when employing the joint channel SVD approach based on dynamic PRG sizes (e.g., SVD based on Equations (3)-(5)) compared to the SVD technique based on fixed PRG sizes (e.g., SVD based on Equations (1)-(2)), in terms of minimum mean square error (MMSE) demodulator or other suitable demodulators.

In some aspects, to accommodate the precoding that adapts to dynamic PRG sizes, a series of preparatory actions may be performed before the radio resource control (RRC) connection is established. For example, prior to the RRC connection being established, the UE may transmit a message declaring its capability to support dynamic PRG sizing. For example, the UE may indicate its support for the methods through which the dynamic PRG sizes are determined, such as by UE itself, received from the network (e.g., a base station), or through simultaneous determinations by both the UE and the network (e.g., a base station). Upon receiving this information, the network (e.g., a base station) may acknowledge the message and provide one or more parameters for the dynamic PRG sizing. These parameters may include the minimum resolution of the RB units, and the number of binary bits allocated for each PRG size. Specifically, if the UE indicates that it supports the simultaneous determinations of dynamic PRG sizes by the UE and the network, which involves the simultaneous calculation of PRG size by both the network (e.g., a base station) and UE, the network (e.g., a base station) may also send the index to the chosen code (e.g., an encoding code) from a set of possible codes for encoding the PRG sizes and the index to the CRC length from the available CRC lengths.

In some examples, the rate of changes to the precoding procedure, due to the dynamic PRG sizing, may align with the update rate for the sounding reference signal (SRS), suggesting that the dynamic PRG size calculations may be performed in the slot following the SRS. For example, in the scenarios the dynamic PRG sizes are determined by receiving from the network (e.g., a base station) or by simultaneous determinations at both the UE and the network (e.g., a base station) once the precoding information is updated, the network (e.g., a base station) may transmit relevant information via the DCI. For example, via DCI, the network may transmit the streams of bits that describe the dynamic PRG sizes for the current slot (when the dynamic PRG sizes are determined by the network), or transmit the calculated CRC of the dynamic PRG stream (when the dynamic PRG sizes are determined by both the UE and the network). In the scenarios where the UE is responsible for calculating the dynamic PRG size, the UE may report the calculated PRG sizes at the SRS rate using an uplink control information (UCI) message, and these PRG sizes may remain valid until the next SRS update.

Figure 5:
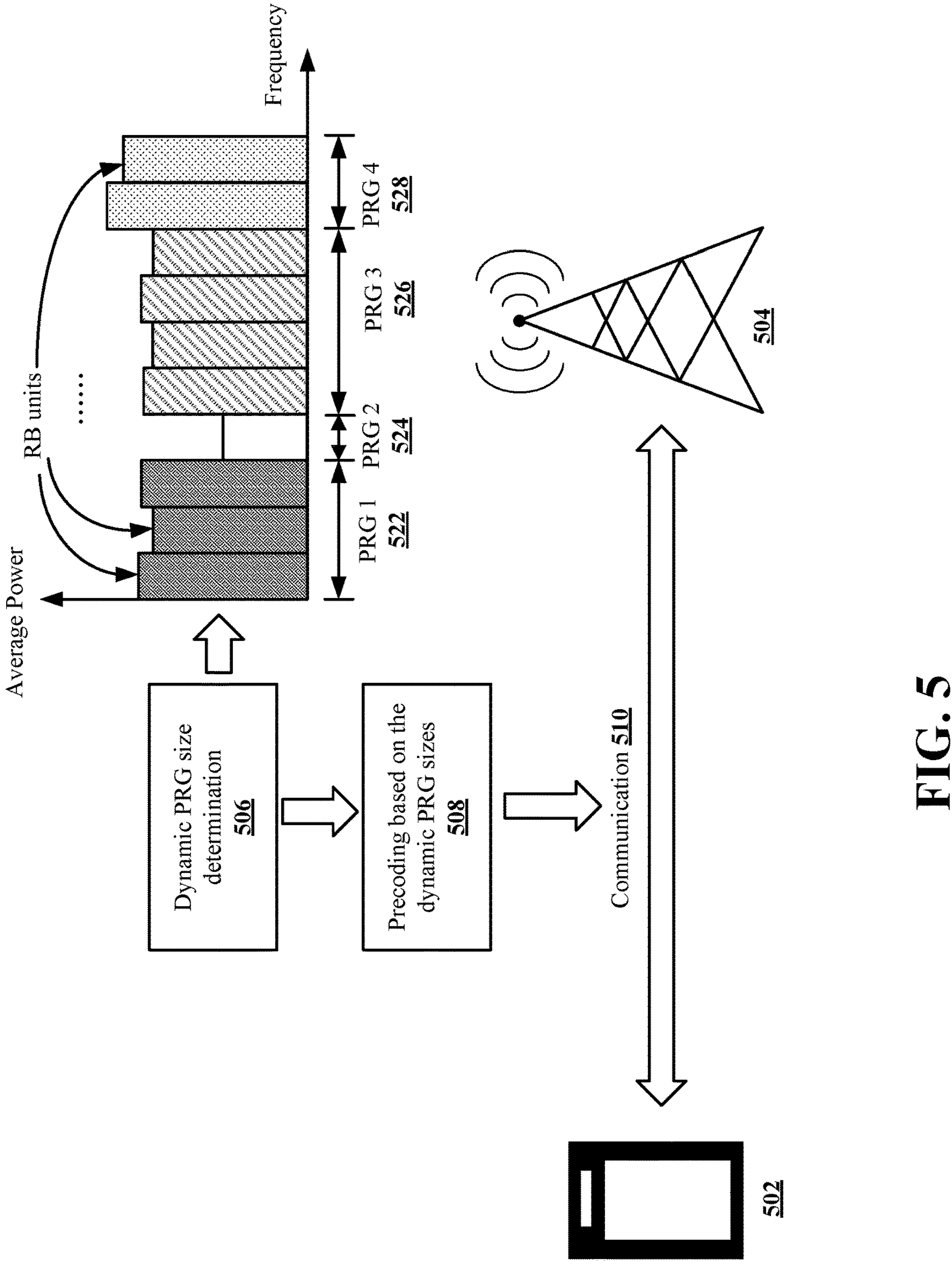
FIG. 5 is a diagram illustrating example communication utilizing dynamic PRG sizes in accordance with various aspects of the present disclosure.

FIG. 5 is a diagram 500 illustrating example communication utilizing dynamic PRG sizes in accordance with various aspects of the present disclosure. In FIG. 5, the UE 502 may first determine the dynamic PRG sizes (at 506). The determination may be made solely by the UE 502, by receiving an indication of the PRG sizes from the base station 504 via DCI, or through simultaneous determinations by the UE 502 and base station 504. The dynamic PRG sizes may be determined based on the channel frequency coherence of the RBs (e.g., based on the RBs' characteristics over a given frequency range). For example, based on the average power of the RB units, the RBs over the frequency range may be grouped into four PRGs (e.g., PRG 1 522, PRG 2 524, PRG 3 526, PRG 4 528), and the dynamic PRG sizes may correspond to the sizes of these PRGs. Upon determining the dynamic PRG sizes, the UE 502 may perform the precoding procedure (at 508) based on the dynamic PRG sizes. For example, the precoding procedure may be the SVD precoding and may be performed in accordance with the process described in Equations (3)-(5). Then, the UE 502 may communicate with the base station 504 (at 510) based on the precoding procedure.

Figure 6:
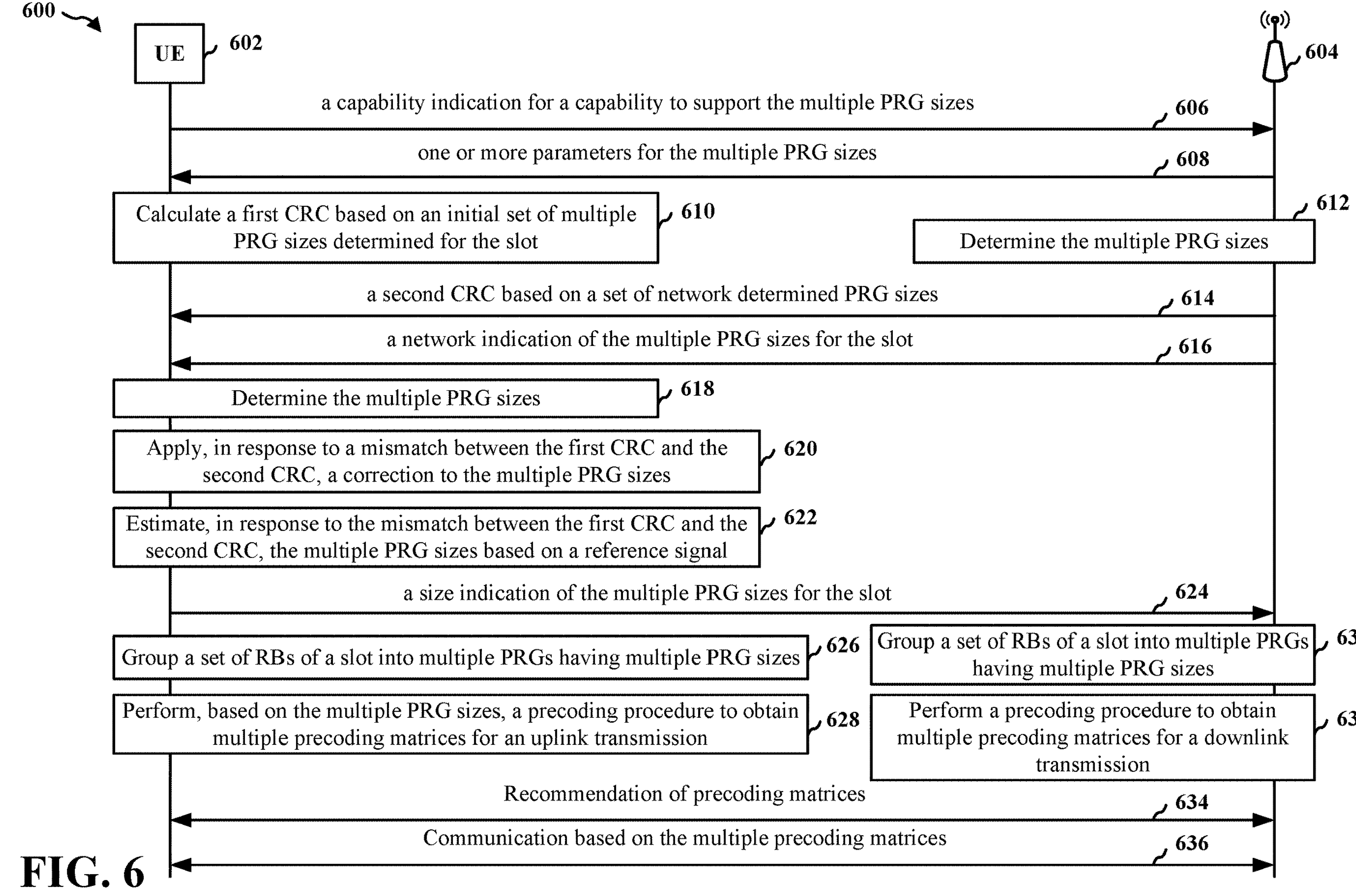
FIG. 6 is a call flow diagram illustrating a method of wireless communication in accordance with various aspects of the present disclosure.

FIG. 6 is a call flow diagram 600 illustrating a method of wireless communication in accordance with various aspects of this present disclosure. Various aspects are described in connection with a UE 602 and a base station 604. The aspects may be performed by the UE 602 or the base station 604 in aggregation and/or by one or more components of a base station 604 (e.g., a CU 110, a DU 130, and/or an RU 140).

As shown in FIG. 6, at 606, the UE 602 may transmit, for the base station 604, a capability indication for the capability to support the multiple PRG sizes. For example, the capability indication may include one of: a first support for receiving the multiple PRG sizes from the base station 604, a second support for calculating the multiple PRG sizes at the UE in parallel with the base station 604, or a third support for providing a size indication of the multiple PRG sizes from the UE 602 to the base station 604.

At 608, the UE 602 may receive, from the base station 604, one or more parameters for the multiple PRG sizes. The one or more parameters may include, for example, the minimum resolution for RB units in the set of RBs (e.g., 4 RBs), the number of binary bits (e.g., 3 bits or 4 bits) for transmitting each PRG size of the multiple PRG sizes in a stream of binary bits, the length of CRC corresponding to the multiple PRG sizes, or a code indication of the encoding code used for encoding the stream of binary bits representing the multiple PRG sizes. For example, the length of CRC may be indicated as a length index identifying a CRC length out of a set of possible CRC lengths, and the code indication may be a code index identifying the encoding code out of a set of predefined codes.

In some examples, when the dynamic PRG sizes are simultaneously determined by the UE 602 and the base station 604, the UE 602 may, at 610, calculate a first CRC based on an initial set of multiple PRG sizes determined for the slot. The first CRC may be compared with another CRC received from the base station 604 to determine whether the dynamic PRG sizes calculated by the UE 602 match those calculated by the base station 604.

At 612, the base station 604 may determine, based on characteristics associated with the set of RBs, multiple PRG sizes. In some examples, the base station may utilize the multiple PRG sizes determined at 612 for downlink communication with the UE 602.

At 614, the base station 604 may transmit, via DCI, a second CRC to the UE 602. The second CRC may be based on the PRG sizes the base station 604 determined at 612.

In some examples, the UE may determine the dynamic PRG sizes by receiving the indication of the dynamic PRG sizes from the base station 604. In that case, the base station 604 may, at 616, transmit a network indication of the multiple PRG sizes for the UE 602. The network indication may indicate the multiple PRG sizes the base station 604 calculated at 612, for example. In some examples, the network indication may be included in the second CRC at 614.

In some examples, the UE may determine the dynamic PRG sizes solely by its own calculation. For example, at 618, the UE 602 may determine the multiple PRG sizes for the slot. The multiple PRG sizes may be determined based on, for example, the characteristics associated with the set of RBs.

In some examples, when the dynamic PRG sizes are determined simultaneously by the UE 602 and the base station 604, the UE 602 may compare the CRC received from the base station 604 (at 614) and the CRC based on its own calculation (at 610). If there is a mismatch between these CRCs, the UE 602 may, at 620, apply a correction to the multiple PRG sizes it calculated (at 610). In some examples, the UE 602 may, at 622, estimate the multiple PRG sizes based on a reference signal, such as a DMRS.

Once the dynamic PRG sizes have been determined (either by the calculation of the UE 602 or the simultaneous determinations of the UE 602 and base station 604), the UE 602 may, at 624, transmit, for the base station 604, a size indication of the multiple PRG sizes for the slot.

At 626, based on the determined PRG sizes, the UE 602 may group the set of RBs of a slot into multiple PRGs. The multiple PRGs may respectively have the multiple PRG sizes.

At 628, the UE 602 may perform, based on the multiple PRG sizes, a precoding procedure to obtain multiple precoding matrices for an uplink transmission with the base station 604. Each precoding matrix of the multiple precoding matrices may be based on a concatenated channel matrix (e.g., matrix $\tilde{H}$ in Equation (3)) based on a corresponding PRG size of the multiple PRG sizes. For downlink transmission, the base station 604 may generate the precoding matrices for downlink transmission independently from the UE 602 (e.g., at 632). Alternatively, in some examples (e.g., at 634), the UE 602 may recommend precoding matrices for downlink transmission from a predefined codebook via a channel state information feedback (CSF) report to the base station 604.

Based on the multiple PRG sizes (e.g., the PRG sizes determined at 612), the base station 604 may, at 630, group the set of RBs of a slot into multiple PRGs. The multiple PRGs may respectively have the multiple PRG sizes.

At 632, the base station 604 may perform, based on the multiple PRG sizes, a precoding procedure to obtain multiple precoding matrices for a downlink transmission with the UE. Each precoding matrix of the multiple precoding matrices may be based on a concatenated channel matrix (e.g., matrix $\tilde{H}$ in Equation (3)) based on a corresponding PRG size of the multiple PRG sizes.

In some examples, at 634, the UE 602 may recommend one or more precoding matrices at a CSF report to the base station 604. The recommended precoding matrices may be from a predefined codebook and may be used by the base station 604 for the downlink communication with the UE 602.

At 636, the UE 602 may communicate with the base station 604 based on the multiple precoding matrices. As an example, the UE may receive PDSCH at 624, the PDSCH being precoded based on the precoding matrices. The UE may use the multiple PRG sizes to receive the PDSCH.

FIG. 7 is a flowchart 700 illustrating methods of wireless communication at a UE in accordance with various aspects of the present disclosure. The method may be performed by a UE. The UE may be the UE 104, 350, 502, 602, or the apparatus 1104 in the hardware implementation of FIG. 11. By enabling dynamic PRG sizes over the frequency range for wireless communication based on, for example, the channel frequency coherence, the methods improve the accuracy in tracking channel variations and reduce edge effects that degrade channel estimation accuracy, leading to improved performance in wireless communication. In some examples, by employing the precoding based on dynamic PRG sizes, the methods improve the channel capacity and ensure that the precoding matrix accurately captures the channel's characteristics across the entire frequency range.

As shown in FIG. 7, at 702, the UE may group a set of RBs of a slot into multiple PRGs having multiple PRG sizes. FIG. 4, FIG. 5, and FIG. 6 illustrate various aspects of the steps in connection with flowchart 700. For example, referring to FIG. 6, the UE 602 may, at 626, group a set of RBs of a slot into multiple PRGs having multiple PRG sizes. Referring to FIG. 4, the UE may group a set of RBs of a slot into multiple PRGs (e.g., PRG 1 422, PRG 2 424, PRG 3 426, PRG 4 428) having multiple PRG sizes. In some aspects, 702 may be performed by the dynamic PRG component 198.

At 704, the UE may communicate with a network entity based on multiple precoding matrices respectively associated with the multiple PRGs having the multiple PRG sizes. The network entity may be a base station, or a component of a base station, in the access network of FIG. 1 or a core network component (e.g., base station 102, 310, 504, 604; or the network entity 1102 in the hardware implementation of FIG. 11). For example, referring to FIG. 6, the UE 602 may, at 636, communicate with a network entity (base station 604) based on multiple precoding matrices respectively associated with the multiple PRGs having the multiple PRG sizes. In some aspects, 704 may be performed by the dynamic PRG component 198.

FIG. 8 is a flowchart 800 illustrating methods of wireless communication at a UE in accordance with various aspects of the present disclosure. The method may be performed by a UE. The UE may be the UE 104, 350, 502, 602, or the apparatus 1104 in the hardware implementation of FIG. 11. By enabling dynamic PRG sizes over the frequency range for wireless communication based on, for example, the channel frequency coherence, the methods improve the accuracy in tracking channel variations and reduce edge effects that degrade channel estimation accuracy, leading to improved performance in wireless communication. In some examples, by employing the precoding based on dynamic PRG sizes, the methods improve the channel capacity and ensure that the precoding matrix accurately captures the channel's characteristics across the entire frequency range.

As shown in FIG. 8, at 822, the UE may group a set of RBs of a slot into multiple PRGs having multiple PRG sizes. FIG. 4, FIG. 5, and FIG. 6 illustrate various aspects of the steps in connection with flowchart 800. For example, referring to FIG. 6, the UE 602 may, at 626, group a set of RBs of a slot into multiple PRGs having multiple PRG sizes. Referring to FIG. 4, the UE may group a set of RBs of a slot into multiple PRGs (e.g., PRG 1 422, PRG 2 424, PRG 3 426, PRG 4 428) having multiple PRG sizes. In some aspects, 822 may be performed by the dynamic PRG component 198.

At 826, the UE may communicate with a network entity based on multiple precoding matrices respectively associated with the multiple PRGs having the multiple PRG sizes. The network entity may be a base station, or a component of a base station, in the access network of FIG. 1 or a core network component (e.g., base station 102, 310, 504, 604; or the network entity 1102 in the hardware implementation of FIG. 11). For example, referring to FIG. 6, the UE 602 may, at 636, communicate with a network entity (base station 604) based on multiple precoding matrices respectively associated with the multiple PRGs having the multiple PRG sizes. In some aspects, 826 may be performed by the dynamic PRG component 198.

In some aspects, at 814, the UE may receive, from the network entity via DCI, a network indication of the multiple PRG sizes for the slot. For example, referring to FIG. 6, the UE 602 may receive, at 616 from the network entity (base station 604) via DCI, a network indication of the multiple PRG sizes for the slot. In some aspects, 814 may be performed by the dynamic PRG component 198.

In some aspects, at 810, the UE may determine, based on characteristics associated with the set of RBs, the multiple PRG sizes for the slot. For example, referring to FIG. 6, the UE 602 may determine, at 618, based on characteristics associated with the set of RBs, the multiple PRG sizes for the slot. Referring to FIG. 4, the UE may determine, based on characteristics associated with the set of RBs (e.g., average power of the RB units), the multiple PRG sizes for the slot (e.g., the multiple PRG sizes for PRG 1 422, PRG 2 424, PRG 3 426, and PRG 4 428). In some aspects, 810 may be performed by the dynamic PRG component 198.

In some aspects, at 820, the UE may transmit, for the network entity, a size indication of the multiple PRG sizes for the slot. For example, referring to FIG. 6, the UE 602 may transmit, at 624 for the network entity (base station 604), a size indication of the multiple PRG sizes for the slot. In some aspects, 820 may be performed by the dynamic PRG component 198.

In some aspects, to determine the multiple PRG sizes (at 810), the UE may group, based on the characteristics associated with the set of RBs, the set of RBs into multiple RB groups each including one or more RB units adjacent to each other. Each RB unit may include one or more RBs of the set of RBs. The difference between a first average value of the characteristics of all RB units in a first RB group of the multiple RB groups and a second average value of the characteristics of all RB units in a second RB group of the multiple RB groups may be greater than a threshold. Then, the UE may set the multiple PRG sizes based on the sizes of the multiple RB groups. For example, referring to FIG. 4, the UE may group, based on the characteristics associated with the set of RBs (average powers of the RB units), the set of RBs into multiple RB groups each including one or more RB units (e.g., RB units 402, 404, 406, 408, 410, 412, 414, 416, 418) adjacent to each other. Each RB unit may include one or more RBs (e.g., 4 RBs) of the set of RBs. The difference between a first average value of the characteristics of all RB units in a first RB group (e.g., PRG 1 422) of the multiple RB groups and a second average value of the characteristics of all RB units in a second RB group (e.g., PRG 2 424) of the multiple RB groups may be greater than a threshold. The multiple PRG sizes may be based on the sizes of the multiple RB groups (e.g., PRG 1 422, PRG 2 424, PRG 3 426, PRG 4 428).

In some aspects, the characteristics of an RB unit may include an average power of all RBs in the RB unit. For example, referring to FIG. 4, the characteristics of an RB unit may include an average power of all RBs in the RB unit (e.g., RB unit 402).

In some aspects, each RB unit includes four RBs. For example, referring to FIG. 4, each RB unit (e.g., RB unit 402, 404, 406, 408) may include four RBs.

In some aspects, to transmit the size indication of the multiple PRG sizes (at 820), the UE may convert the multiple PRG sizes into a stream of binary bits. Each PRG size of the multiple PRG sizes may occupy a first number of binary bits in the stream of binary bits. Then, the UE may encode the stream of binary bits using an encoding code to obtain an encoded stream; and transmit, via a UCI message, the encoded stream indicating the multiple PRG sizes. For example, referring to FIG. 6, to transmit the size indication of the multiple PRG sizes (at 624), the UE 602 may convert the multiple PRG sizes (e.g., the sizes of 3, 1, 4, 1 (RB units) in the example of FIG. 4) into a stream of binary bits. Each PRG size of the multiple PRG sizes may occupy a first number of binary bits (e.g., 3 or 4 bits) in the stream of binary bits.

In some aspects, at 804, the UE may receive, from the network entity in response to the capability indication (at 802), one or more parameters for the multiple PRG sizes. The one or more parameters may include one or more of: the minimum resolution for RB units in the set of RBs, the first number of binary bits in the stream of binary bits for transmitting each PRG size of the multiple PRG sizes, the length of CRC corresponding to the multiple PRG sizes, or a code indication of the encoding code used for encoding the streams of binary bits. For example, referring to FIG. 6, the UE 602 may receive, at 608 from the network entity (base station 604) in response to the capability indication (at 606), one or more parameters for the multiple PRG sizes. The one or more parameters may include one or more of: the minimum resolution for RB units in the set of RBs (e.g., 4 RBs), the first number of binary bits (e.g., 3 or 4 bits) in the stream of binary bits for transmitting each PRG size of the multiple PRG sizes, the length of CRC corresponding to the multiple PRG sizes or the code indication of the encoding code used for encoding the stream of binary bits. For example, the length of CRC may be indicated as a length index identifying a CRC length out of a set of possible CRC lengths, and the code indication may be a code index identifying the encoding code out of a set of predefined codes. In some aspects, 804 may be performed by the dynamic PRG component 198.

In some aspects, at 806, the UE may calculate a first CRC based on an initial set of multiple PRG sizes determined for the slot. At 808, the UE may receive, from the network entity via DCI, a second CRC based on a set of network determined PRG sizes. For example, referring to FIG. 6, the UE 602 may, at 610, calculate a first CRC based on an initial set of multiple PRG sizes determined for the slot. The UE 602 may receive, at 614 from the network entity (base station) via DCI, a second CRC based on a set of network determined PRG sizes (at 612). In some aspects, 806 and 808 may be performed by the dynamic PRG component 198.

In some aspects, to determine the multiple PRG sizes (at 810), the UE may, at 812, compare the first CRC to the second CRC. For example, referring to FIG. 6, to determine the multiple PRG sizes (at 618), the UE 602 may compare the first CRC (calculated at 610) to the second CRC (received at 614). In some aspects, 812 may be performed by the dynamic PRG component 198.

In some aspects, if there is a mismatch between the first CRC and the second CRC, the UE may, at 816, apply a correction to the multiple PRG sizes. For example, referring to FIG. 6, the UE 602 may, at 620, apply a correction to the multiple PRG sizes. In some aspects, 816 may be performed by the dynamic PRG component 198.

In some aspects, if there is a mismatch between the first CRC and the second CRC, the UE may, at 818, estimate the multiple PRG sizes based on a reference signal. For example, referring to FIG. 6, the UE 602 may, at 622, estimate the multiple PRG sizes based on a reference signal. In some aspects, 818 may be performed by the dynamic PRG component 198.

In some aspects, at 824, the UE may perform a precoding procedure based on the multiple PRG sizes to obtain the multiple precoding matrices for an uplink transmission with the network entity. Each precoding matrix of the multiple precoding matrices may be based on a concatenated channel matrix based on a corresponding PRG size of the multiple PRG sizes. For example, referring to FIG. 6, the UE 602 may perform, at 628, a precoding procedure based on the multiple PRG sizes to obtain the multiple precoding matrices for an uplink transmission with the network entity (base station 604). Each precoding matrix of the multiple precoding matrices the may be based on a concatenated channel matrix (e.g., matrix $\tilde{H}$ in Equation (3)) based on a corresponding PRG size of the multiple PRG sizes. In some aspects, 824 may be performed by the dynamic PRG component 198.

In some aspects, to perform the precoding procedure (at 824), the UE may perform, for each precoding matrix of the multiple precoding matrices, a singular value decomposition on the concatenated channel matrix. The precoding matrix for the uplink transmission with the network entity may be based on a right eigenmatrix of the singular value decomposition of the concatenated channel matrix. For example, the UE may perform a singular value decomposition (e.g., based on Equation (4)) on the concatenated channel matrix (e.g., matrix $\tilde{H}$)). The precoding matrix may be based on a right eigenmatrix (e.g., $V_2$ in Equation (4)) of the singular value decomposition of the concatenated channel matrix (e.g., matrix $\tilde{H}$).

In some aspects, at 802, the UE may transmit, for the network entity, a capability indication for the capability to support the multiple PRG sizes. For example, referring to FIG. 6, the UE 602 may transmit, at 606 for the network entity (base station 604), a capability indication for the capability to support the multiple PRG sizes. In some aspects, 802 may be performed by the dynamic PRG component 198.

In some aspects, the capability indication may further include one of: a first support for receiving the multiple PRG sizes from the network entity, a second support for calculating the multiple PRG sizes at the UE in parallel with the network entity, or a third support for providing a size indication of the multiple PRG sizes from the UE to the network entity. For example, referring to FIG. 6, the capability indication (at 606) may include one of: a first support for receiving the multiple PRG sizes from the network entity (base station 604), a second support for calculating the multiple PRG sizes at the UE 602 in parallel with the network entity (base station 604), or a third support for providing a size indication of the multiple PRG sizes from the UE 602 to the network entity (base station 604).

In some aspects, to communicate with the network entity (at 826), the UE may transmit or receive communication that is precoded based on the multiple PRGs that have different PRG sizes over a frequency domain of the communication. For example, referring to FIG. 6, to communicate with the network entity (base station 604) (at 636), the UE 602 may transmit or receive communication that is precoded based on the multiple PRGs that have different PRG sizes over a frequency domain of the communication.

Figure 9:
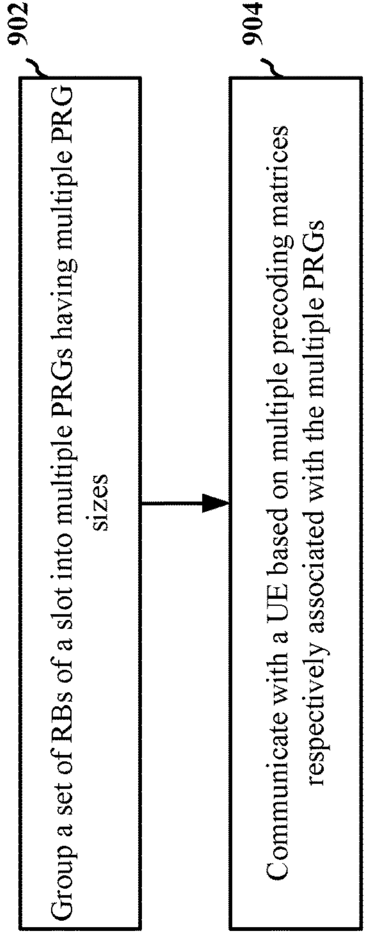
FIG. 9 is a flowchart illustrating methods of wireless communication at a network entity in accordance with various aspects of the present disclosure.

FIG. 9 is a flowchart 900 illustrating methods of wireless communication at a network entity in accordance with various aspects of the present disclosure. The method may be performed by a network entity. The network entity may be a base station, or a component of a base station, in the access network of FIG. 1 or a core network component (e.g., base station 102, 310, 504, 604; or the network entity 1102 in the hardware implementation of FIG. 11). By enabling dynamic PRG sizes over the frequency range for wireless communication based on, for example, the channel frequency coherence, the methods improve the accuracy in tracking channel variations and reduce edge effects that degrade channel estimation accuracy, leading to improved performance in wireless communication. In some examples, by employing the precoding based on dynamic PRG sizes, the methods improve the channel capacity and ensure that the precoding matrix accurately captures the channel's characteristics across the entire frequency range.

As shown in FIG. 9, at 902, the network entity may group a set of RBs of a slot into multiple PRGs having multiple PRG sizes. FIG. 4, FIG. 5, and FIG. 6 illustrate various aspects of the steps in connection with flowchart 900. For example, referring to FIG. 6, the network entity (base station 604) may, at 630, group a set of RBs of a slot into multiple PRGs having multiple PRG sizes. In some aspects, 902 may be performed by the dynamic PRG component 199.

At 904, the network entity may communicate with a UE based on multiple precoding matrices respectively associated with the multiple PRGs. The UE may be the UE 104, 350, 502, 602, or the apparatus 1104 in the hardware implementation of FIG. 11. For example, referring to FIG. 6, the network entity (base station 604) may, at 636, communicate with a UE 602 based on multiple precoding matrices respectively associated with the multiple PRGs having the multiple PRG sizes. In some aspects, 904 may be performed by the dynamic PRG component 199.

Figure 10:
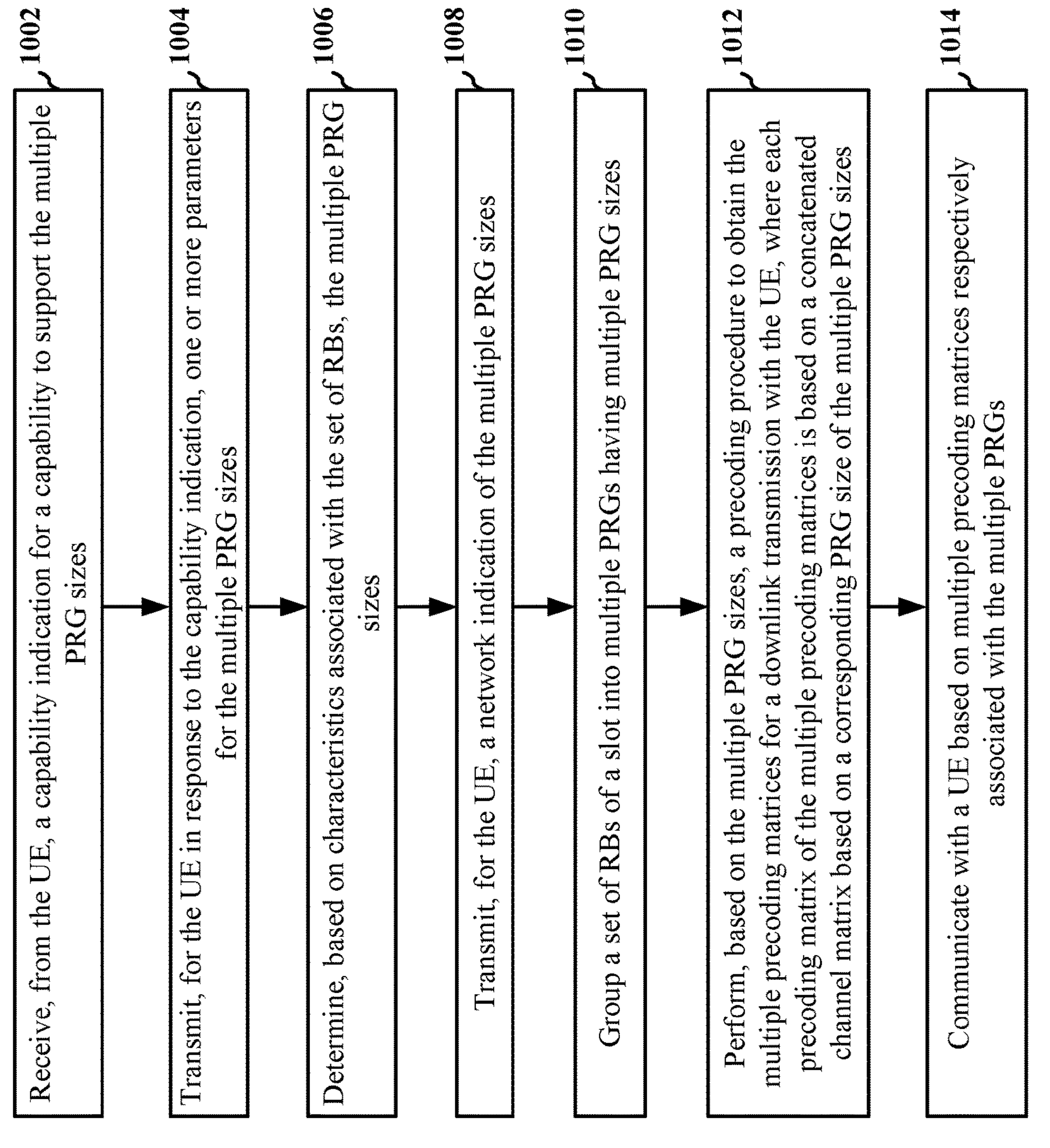
FIG. 10 is a flowchart illustrating methods of wireless communication at a network entity in accordance with various aspects of the present disclosure.

FIG. 10 is a flowchart 1000 illustrating methods of wireless communication at a network entity in accordance with various aspects of the present disclosure. The method may be performed by a network entity. The network entity may be a base station, or a component of a base station, in the access network of FIG. 1 or a core network component (e.g., base station 102, 310, 504, 604; or the network entity 1102 in the hardware implementation of FIG. 11). By enabling dynamic PRG sizes over the frequency range for wireless communication based on, for example, the channel frequency coherence, the methods improve the accuracy in tracking channel variations and reduce edge effects that degrade channel estimation accuracy, leading to improved performance in wireless communication. In some examples, by employing the precoding based on dynamic PRG sizes, the methods improve the channel capacity and ensure that the precoding matrix accurately captures the channel's characteristics across the entire frequency range.

As shown in FIG. 10, at 1010, the network entity may group a set of RBs of a slot into multiple PRGs having multiple PRG sizes. FIG. 4, FIG. 5, and FIG. 6 illustrate various aspects of the steps in connection with flowchart 1000. For example, referring to FIG. 6, the network entity (base station 604) may, at 630, group a set of RBs of a slot into multiple PRGs having multiple PRG sizes. In some aspects, 1010 may be performed by the dynamic PRG component 199.

At 1014, the network entity may communicate with a UE based on multiple precoding matrices respectively associated with the multiple PRGs. The UE may be the UE 104, 350, 502, 602, or the apparatus 1104 in the hardware implementation of FIG. 11. For example, referring to FIG. 6, the network entity (base station 604) may, at 636, communicate with a UE 602 based on multiple precoding matrices respectively associated with the multiple PRGs having the multiple PRG sizes. In some aspects, 1014 may be performed by the dynamic PRG component 199.

In some aspects, at 1006, the network entity may determine, based on characteristics associated with the set of RBs, the multiple PRG sizes. For example, referring to FIG. 6, the network entity (base station 604) may determine, at 612 based on characteristics associated with the set of RBs, the multiple PRG sizes. In some aspects, 1006 may be performed by the dynamic PRG component 199.

In some aspects, at 1008, the network entity may transmit, for the UE, a network indication of the multiple PRG sizes. For example, referring to FIG. 6, the network entity (base station 604) may transmit, at 606, for the UE 602, a network indication of the multiple PRG sizes. In some aspects, 1008 may be performed by the dynamic PRG component 199.

In some aspects, the network indication (at 1008) may be included in a CRC. For example, referring to FIG. 6, the network indication (at 616) may be included in a CRC (e.g., the second CRC at 614).

In some aspects, to determine the multiple PRG sizes (at 1006), the network entity may group, based on the characteristics associated with the set of RBs, the set of RBs into multiple RB groups each including one or more RB units adjacent to each other. Each RB unit may include one or more RBs of the set of RBs. The difference between a first average value of the characteristics of all RB units in a first RB group of the multiple RB groups and a second average value of the characteristics of all RB units in a second RB group of the multiple RB groups may be greater than a threshold. Then, the network entity may set the multiple PRG sizes based on the sizes of the multiple RB groups. For example, referring to FIG. 4, the network entity may group, based on the characteristics associated with the set of RBs (average powers of the RB units), the set of RBs into multiple RB groups each including one or more RB units (e.g., RB units 402, 404, 406, 408, 410, 412, 414, 416, 418) adjacent to each other. Each RB unit may include one or more RBs (e.g., 4 RBs) of the set of RBs. The difference between a first average value of the characteristics of all RB units in a first RB group (e.g., PRG 1 422) of the multiple RB groups and a second average value of the characteristics of all RB units in a second RB group (e.g., PRG 2 424) of the multiple RB groups may be greater than a threshold. The multiple PRG sizes may be based on the sizes of the multiple RB groups (e.g., PRG 1 422, PRG 2 424, PRG 3 426, PRG 4 428).

In some aspects, the characteristics of an RB unit may include an average power of all RBs in the RB unit. For example, referring to FIG. 4, the characteristics of an RB unit may include an average power of all RBs in the RB unit (e.g., RB unit 402).

In some aspects, each RB unit may include four RBs. For example, referring to FIG. 4, each RB unit (e.g., RB unit 402, 404, 406, 408) may include four RBs.

In some aspects, to transmit the network indication of the multiple PRG sizes (at 1008), the network entity may convert the multiple PRG sizes into a stream of binary bits. Each PRG size of the multiple PRG sizes may occupy a first number of binary bits in the stream of binary bits. The network entity may encode the stream of binary bits using an encoding code to obtain an encoded stream; and transmit, via DCI, the network indication of the multiple PRG sizes in the encoded stream. For example, referring to FIG. 6, to transmit the network indication of the multiple PRG sizes (at 616), the network entity (base station 604) may convert the multiple PRG sizes (e.g., the sizes of 3, 1, 4, 1 (RB units) in the example of FIG. 4) into a stream of binary bits. Each PRG size of the multiple PRG sizes may occupy a first number of binary bits (e.g., 3 or 4 bits) in the stream of binary bits.

In some aspects, at 1012, the network entity may perform, based on the multiple PRG sizes, a precoding procedure to obtain the multiple precoding matrices for a downlink transmission with the UE. Each precoding matrix of the multiple precoding matrices may be based on a concatenated channel matrix based on a corresponding PRG size of the multiple PRG sizes. For example, referring to FIG. 6, the network entity (base station 604) may perform, at 632 based on the multiple PRG sizes, a precoding procedure to obtain the multiple precoding matrices for a downlink transmission with the UE 602. Each precoding matrix of the multiple precoding matrices may be based on a concatenated channel matrix (e.g., matrix $\tilde{H}$ in Equation (3)) based on a corresponding PRG size of the multiple PRG sizes. In some aspects, 1012 may be performed by the dynamic PRG component 199.

In some aspects, to perform the precoding procedure (at 1012), the network entity may perform, for each precoding matrix of the multiple precoding matrices, a singular value decomposition on the concatenated channel matrix. The precoding matrix for the downlink transmission with the UE may be based on a right eigenmatrix of the singular value decomposition of the concatenated channel matrix. For example, the network entity may perform a singular value decomposition (e.g., based on Equation (4)) on the concatenated channel matrix (e.g., matrix $\tilde{H}$)). The precoding matrix may be based on a right eigenmatrix (e.g., $V_2$ in Equation (4)) of the singular value decomposition of the concatenated channel matrix (e.g., matrix $\tilde{H}$).

In some aspects, at 1002, the network entity may receive, from the UE, a capability indication for a capability to support the multiple PRG sizes. For example, referring to FIG. 6, the network entity (base station 604) may receive, at 606 from the UE 602, a capability indication for a capability to support the multiple PRG sizes. In some aspects, 1002 may be performed by the dynamic PRG component 199.

In some aspects, at 1004, the network entity may transmit, for the UE in response to the capability indication (at 1002), one or more parameters for the multiple PRG sizes. The one or more parameters may one or more of: the minimum resolution for RB units in the set of RBs, the number of binary bits for transmitting each PRG size of the multiple PRG sizes, the length of CRC corresponding to the multiple PRG sizes, or a code indication of an encoding code used for encoding a stream of binary bits representing the multiple PRG sizes. For example, referring to FIG. 6, the network entity (base station 604) may transmit, at 608 for the UE 602 in response to the capability indication (at 606), one or more parameters for the multiple PRG sizes. The one or more parameters may one or more of: the minimum resolution for RB units in the set of RBs, the number of binary bits for transmitting each PRG size of the multiple PRG sizes, the length of CRC corresponding to the multiple PRG sizes, or a code indication of an encoding code used for encoding a stream of binary bits representing the multiple PRG sizes. For example, the length of CRC may be indicated as a length index identifying a CRC length out of a set of possible CRC lengths, and the code indication may be a code index identifying the encoding code out of a set of predefined codes. In some aspects, 1004 may be performed by the dynamic PRG component 199.

Figure 11:
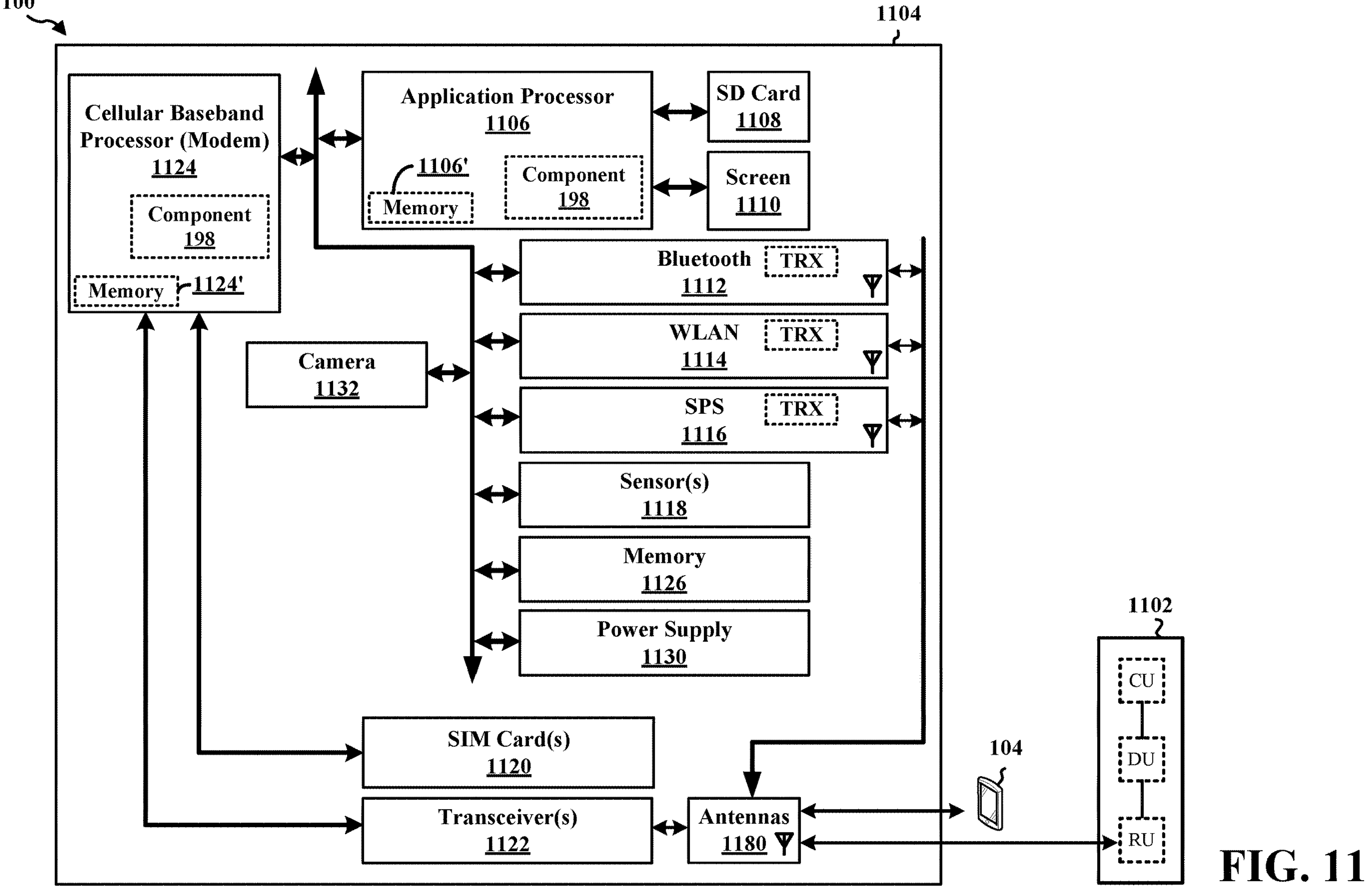
FIG. 11 is a diagram illustrating an example of a hardware implementation for an example apparatus and/or network entity.

FIG. 11 is a diagram 1100 illustrating an example of a hardware implementation for an apparatus 1104. The apparatus 1104 may be a UE, a component of a UE, or may implement UE functionality. In some aspects, the apparatus 1104 may include at least one cellular baseband processor (or processing circuitry) 1124 (also referred to as a modem) coupled to one or more transceivers 1122 (e.g., cellular RF transceiver). The cellular baseband processor(s) (or processing circuitry) 1124 may include at least one on-chip memory (or memory circuitry) 1124'. In some aspects, the apparatus 1104 may further include one or more subscriber identity modules (SIM) cards 1120 and at least one application processor (or processing circuitry) 1106 coupled to a secure digital (SD) card 1108 and a screen 1110. The application processor(s) (or processing circuitry) 1106 may include on-chip memory (or memory circuitry) 1106'. In some aspects, the apparatus 1104 may further include a Bluetooth module 1112, a WLAN module 1114, an SPS module 1116 (e.g., GNSS module), one or more sensor modules 1118 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1126, a power supply 1130, and/or a camera 1132. The Bluetooth module 1112, the WLAN module 1114, and the SPS module 1116 may include an on-chip transceiver (TRX) (or in some cases, just a receiver (RX)). The Bluetooth module 1112, the WLAN module 1114, and the SPS module 1116 may include their own dedicated antennas and/or utilize the antennas 1180 for communication. The cellular baseband processor(s) (or processing circuitry) 1124 communicates through the transceiver(s) 1122 via one or more antennas 1180 with the UE 104 and/or with an RU associated with a network entity 1102. The cellular baseband processor(s) (or processing circuitry) 1124 and the application processor(s) (or processing circuitry) 1106 may each include a computer-readable medium/memory (or memory circuitry) 1124', 1106', respectively. The additional memory modules 1126 may also be considered a computer-readable medium/memory (or memory circuitry). Each computer-readable medium/memory (or memory circuitry) 1124', 1106', 1126 may be non-transitory. The cellular baseband processor(s) (or processing circuitry) 1124 and the application processor(s) (or processing circuitry) 1106 are each responsible for general processing, including the execution of software stored on the computer-readable medium/memory (or memory circuitry). The software, when executed by the cellular baseband processor(s) (or processing circuitry) 1124/application processor(s) (or processing circuitry) 1106, causes the cellular baseband processor(s) (or processing circuitry) 1124/application processor(s) (or processing circuitry) 1106 to perform the various functions described supra. The cellular baseband processor(s) (or processing circuitry) 1124 and the application processor(s) (or processing circuitry) 1106 are configured to perform the various functions described supra based at least in part of the information stored in the memory (or memory circuitry). That is, the cellular baseband processor(s) (or processing circuitry) 1124 and the application processor(s) (or processing circuitry) 1106 may be configured to perform a first subset of the various functions described supra without information stored in the memory and may be configured to perform a second subset of the various functions described supra based on the information stored in the memory. The computer-readable medium/memory (or memory circuitry) may also be used for storing data that is manipulated by the cellular baseband processor(s) (or processing circuitry) 1124/application processor(s) (or processing circuitry) 1106 when executing software. The cellular baseband processor(s) (or processing circuitry) 1124/application processor(s) (or processing circuitry) 1106 may be a component of the UE 350 and may include the at least one memory 360 and/or at least one of the TX processor 368, the RX processor 356, and the controller/processor 359. In one configuration, the apparatus 1104 may be at least one processor chip (modem and/or application) and include just the cellular baseband processor(s) (or processing circuitry) 1124 and/or the application processor(s) (or processing circuitry) 1106, and in another configuration, the apparatus 1104 may be the entire UE (e.g., see UE 350 of FIG. 3) and include the additional modules of the apparatus 1104.

As discussed supra, the component 198 may be configured to group a set of RBs of a slot into multiple PRGs having multiple PRG sizes; and communicate with a network entity based on multiple precoding matrices respectively associated with the multiple PRGs having the multiple PRG sizes. The component 198 may be further configured to perform any of the aspects described in connection with the flowcharts in FIG. 7 and FIG. 8, and/or performed by the UE 602 in FIG. 6. The component 198 may be within the cellular baseband processor(s) (or processing circuitry) 1124, the application processor(s) (or processing circuitry) 1106, or both the cellular baseband processor(s) (or processing circuitry) 1124 and the application processor(s) (or processing circuitry) 1106. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1104 may include a variety of components configured for various functions. In one configuration, the apparatus 1104, and in particular the cellular baseband processor(s) (or processing circuitry) 1124 and/or the application processor(s) (or processing circuitry) 1106, includes means for grouping a set of RBs of a slot into multiple PRGs having multiple PRG sizes, and means for communicating with a network entity based on multiple precoding matrices respectively associated with the multiple PRGs having the multiple PRG sizes. The apparatus 1104 may further include means for performing any of the aspects described in connection with the flowcharts in FIG. 7 and FIG. 8, and/or aspects performed by the UE 602 in FIG. 6. The means may be the component 198 of the apparatus 1104 configured to perform the functions recited by the means. As described supra, the apparatus 1104 may include the TX processor 368, the RX processor 356, and the controller/processor 359. As such, in one configuration, the means may be the TX processor 368, the RX processor 356, and/or the controller/processor 359 configured to perform the functions recited by the means.

Figure 12:
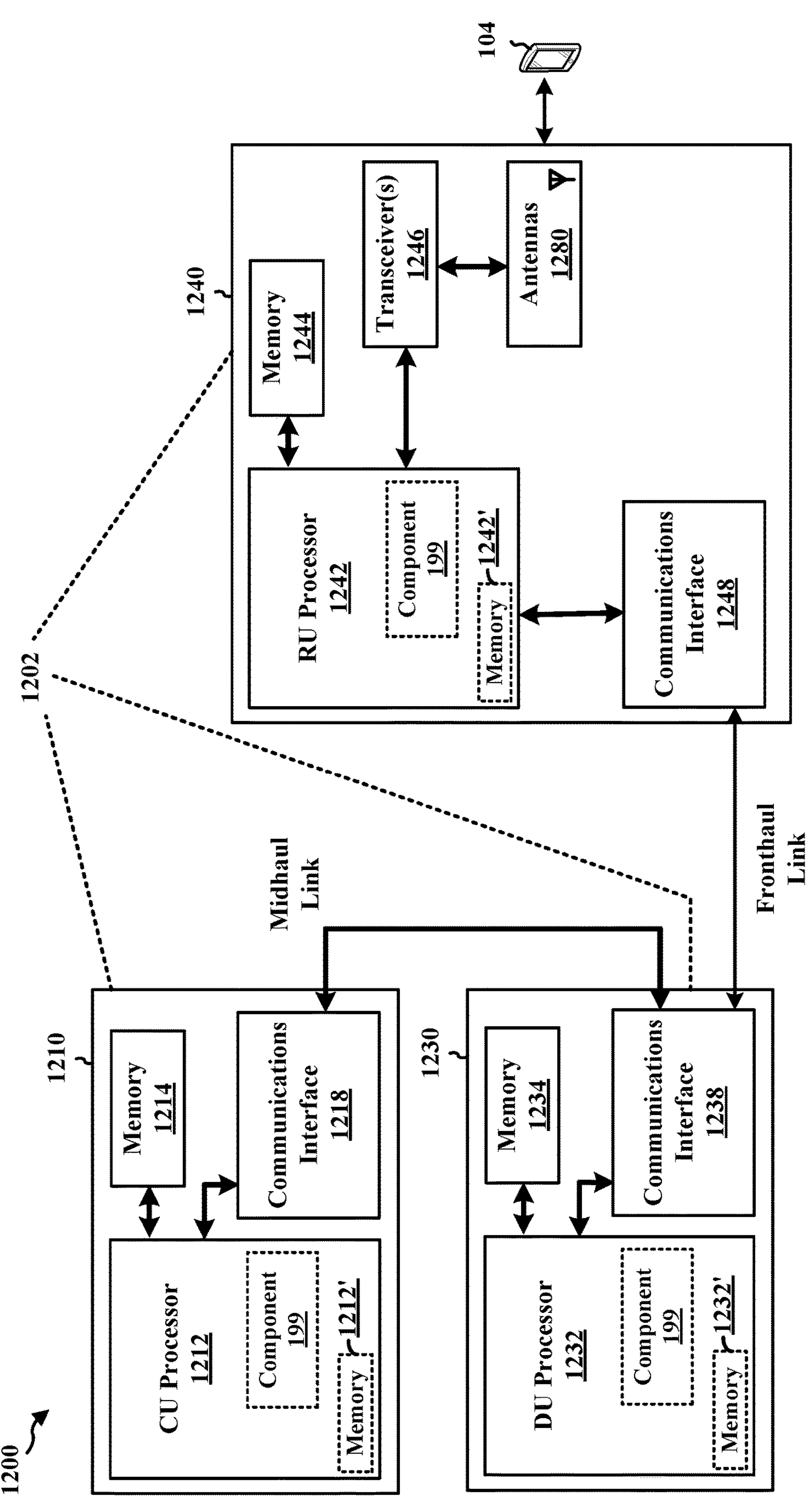
FIG. 12 is a diagram illustrating an example of a hardware implementation for an example network entity.

FIG. 12 is a diagram 1200 illustrating an example of a hardware implementation for a network entity 1202. The network entity 1202 may be a BS, a component of a BS, or may implement BS functionality. The network entity 1202 may include at least one of a CU 1210, a DU 1230, or an RU 1240. For example, depending on the layer functionality handled by the component 199, the network entity 1202 may include the CU 1210; both the CU 1210 and the DU 1230; each of the CU 1210, the DU 1230, and the RU 1240; the DU 1230; both the DU 1230 and the RU 1240; or the RU 1240. The CU 1210 may include at least one CU processor (or processing circuitry) 1212. The CU processor(s) (or processing circuitry) 1212 may include on-chip memory (or memory circuitry) 1212'. In some aspects, the CU 1210 may further include additional memory modules 1214 and a communications interface 1218. The CU 1210 communicates with the DU 1230 through a midhaul link, such as an F1 interface. The DU 1230 may include at least one DU processor (or processing circuitry) 1232. The DU processor(s) (or processing circuitry) 1232 may include on-chip memory (or memory circuitry) 1232'. In some aspects, the DU 1230 may further include additional memory modules 1234 and a communications interface 1238. The DU 1230 communicates with the RU 1240 through a fronthaul link. The RU 1240 may include at least one RU processor (or processing circuitry) 1242. The RU processor(s) (or processing circuitry) 1242 may include on-chip memory (or memory circuitry) 1242'. In some aspects, the RU 1240 may further include additional memory modules 1244, one or more transceivers 1246, antennas 1280, and a communications interface 1248. The RU 1240 communicates with the UE 104. The on-chip memory (or memory circuitry) 1212', 1232', 1242' and the additional memory modules 1214, 1234, 1244 may each be considered a computer-readable medium/memory (or memory circuitry). Each computer-readable medium/memory (or memory circuitry) may be non-transitory. Each of the processors (or processing circuitry) 1212, 1232, 1242 is responsible for general processing, including the execution of software stored on the computer-readable medium/memory (or memory circuitry). The software, when executed by the corresponding processor(s) (or processing circuitry) causes the processor(s) (or processing circuitry) to perform the various functions described supra. The computer-readable medium/memory (or memory circuitry) may also be used for storing data that is manipulated by the processor(s) (or processing circuitry) when executing software.

As discussed supra, the component 199 may be configured to group a set of RBs of a slot into multiple PRGs having multiple PRG sizes; and communicate with a UE based on multiple precoding matrices respectively associated with the multiple PRGs. The component 199 may be further configured to perform any of the aspects described in connection with the flowcharts in FIG. 9 and FIG. 10, and/or performed by the base station 604 in FIG. 6. The component 199 may be within one or more processors (or processing circuitry) of one or more of the CU 1210, DU 1230, and the RU 1240. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1202 may include a variety of components configured for various functions. In one configuration, the network entity 1202 includes means for grouping a set of RBs of a slot into multiple PRGs having multiple PRG sizes, and means for communicating with a UE based on multiple precoding matrices respectively associated with the multiple PRGs. The network entity 1202 may further include means for performing any of the aspects described in connection with the flowcharts in FIG. 9 and FIG. 10, and/or aspects performed by the base station 604 in FIG. 6. The means may be the component 199 of the network entity 1202 configured to perform the functions recited by the means. As described supra, the network entity 1202 may include the TX processor 316, the RX processor 370, and the controller/processor 375. As such, in one configuration, the means may be the TX processor 316, the RX processor 370, and/or the controller/processor 375 configured to perform the functions recited by the means.

This disclosure provides a method for wireless communication at a UE. The method may include grouping a set of RBs of a slot into multiple PRGs having multiple PRG sizes; and communicating with a network entity based on multiple precoding matrices respectively associated with the multiple PRGs having the multiple PRG sizes. By enabling dynamic PRG sizes over the frequency range for wireless communication based on, for example, the channel frequency coherence, the methods improve the accuracy in tracking channel variations and reduce edge effects that degrade channel estimation accuracy, leading to improved performance in wireless communication. In some examples, by employing the precoding based on dynamic PRG sizes, the methods improve the channel capacity and ensure that the precoding matrix accurately captures the channel's characteristics across the entire frequency range.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data or "provide" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE. The method includes grouping a set of resource blocks (RBs) of a slot into multiple physical resource block groups (PRGs) having multiple PRG sizes; and communicating with a network entity based on multiple precoding matrices respectively associated with the multiple PRGs having the multiple PRG sizes.

Aspect 2 is the method of aspect 1, where the method further includes receiving, from the network entity via downlink channel information (DCI), a network indication of the multiple PRG sizes for the slot.

Aspect 3 is the method of aspect 1, where the method further includes determining, based on characteristics associated with the set of RBs, the multiple PRG sizes for the slot.

Aspect 4 is the method of aspect 3, where the method further includes transmitting, for the network entity, a size indication of the multiple PRG sizes for the slot.

Aspect 5 is the method of aspect 3, wherein determining the multiple PRG sizes comprises: grouping, based on the characteristics associated with the set of RBs, the set of RBs into multiple RB groups each comprising one or more RB units adjacent to each other, each RB unit comprising one or more RBs of the set of RBs, wherein a difference between a first average value of the characteristics of all RB units in a first RB group of the multiple RB groups and a second average value of the characteristics of all RB units in a second RB group of the multiple RB groups is greater than a threshold; and setting, based on sizes of the multiple RB groups, the multiple PRG sizes.

Aspect 6 is the method of aspect 5, wherein the characteristics of an RB unit include an average power of all RBs in the RB unit.

Aspect 7 is the method of aspect 5, wherein each RB unit includes four RBs.

Aspect 8 is the method of aspect 4, wherein transmitting the size indication of the multiple PRG sizes comprises: converting the multiple PRG sizes into a stream of binary bits, wherein each PRG size of the multiple PRG sizes occupies a first number of binary bits in the stream of binary bits; encoding the stream of binary bits using an encoding code to obtain an encoded stream; and transmitting, via an uplink control information (UCI) message, the encoded stream indicating the multiple PRG sizes.

Aspect 9 is the method of aspect 8, where the method further includes receiving, from the network entity, one or more parameters for the multiple PRG sizes, wherein the one or more parameters comprise one or more of: a minimum resolution for RB units in the set of RBs, the first number of binary bits in the stream of binary bits for transmitting each PRG size of the multiple PRG sizes, a length of cyclic redundancy check (CRC) corresponding to the multiple PRG sizes, or a code indication of the encoding code used for encoding the stream of binary bits.

Aspect 10 is the method of any of aspects 1 to 3, where the method further includes calculating a first cyclic redundancy check (CRC) based on an initial set of multiple PRG sizes determined for the slot; and receiving, from the network entity via downlink control information (DCI), a second cyclic redundancy check (CRC) based on a set of network determined PRG sizes, and wherein determining the multiple PRG sizes comprises: comparing the first CRC to the second CRC.

Aspect 11 is the method of aspect 10, where the method further includes applying, in response to a mismatch between the first CRC and the second CRC, a correction to the multiple PRG sizes, or estimating, in response to the mismatch between the first CRC and the second CRC, the multiple PRG sizes based on a reference signal.

Aspect 12 is the method of any of aspects 1 to 10, where the method further includes performing, based on the multiple PRG sizes, a precoding procedure to obtain the multiple precoding matrices for an uplink transmission with the network entity, wherein each precoding matrix of the multiple precoding matrices is based on a concatenated channel matrix based on a corresponding PRG size of the multiple PRG sizes.

Aspect 13 is the method of aspect 12, wherein performing the precoding procedure comprises: performing, for each precoding matrix of the multiple precoding matrices, a singular value decomposition on the concatenated channel matrix, wherein the precoding matrix for the uplink transmission with the network entity is based on a right eigenmatrix of the singular value decomposition of the concatenated channel matrix.

Aspect 14 is the method of any of aspects 1 to 13, where the method further includes transmitting, for the network entity, a capability indication for a capability to support the multiple PRG sizes.

Aspect 15 is the method of aspect 14, wherein the capability indication further comprises one of: a first support for receiving the multiple PRG sizes from the network entity, a second support for calculating the multiple PRG sizes at the UE in parallel with the network entity, or a third support for providing a size indication of the multiple PRG sizes from the UE to the network entity.

Aspect 16 is the method of any of aspects 1 to 15, wherein communicating with the network entity includes transmitting or receiving communication that is precoded based on the multiple PRGs that have different PRG sizes over a frequency domain of the communication.

Aspect 17 is an apparatus for wireless communication at a UE, comprising: a processing system that includes processor circuitry and memory circuitry that stores code and is coupled with the processor circuitry, the processing system configured to cause the UE to perform the method of one or more of aspects 1-16.

Aspect 18 is an apparatus for wireless communication at a UE, comprising: at least one memory; and at least one processor coupled to the at least one memory and, where the at least one processor, individually or in any combination, is configured to perform the method of any of aspects 1-16.

Aspect 19 is the apparatus for wireless communication at a UE, comprising means for performing each step in the method of any of aspects 1-16.

Aspect 20 is an apparatus of any of aspects 17-19, further comprising a transceiver configured to receive or to transmit in association with the method of any of aspects 1-16.

Aspect 21 is a computer-readable medium (e.g., a non-transitory computer-readable medium) storing computer executable code at a UE, the code when executed by at least one processor causes the at least one processor to, individually or in any combination, perform the method of any of aspects 1-16.

Aspect 22 is a method of wireless communication at a network entity. The method includes grouping a set of resource blocks (RBs) of a slot into multiple physical resource block groups (PRGs) having multiple PRG sizes; and communicating with a user equipment (UE) based on multiple precoding matrices respectively associated with the multiple PRGs.

Aspect 23 is the method of aspect 22, where the method further includes determining, based on characteristics associated with the set of RBs, the multiple PRG sizes.

Aspect 24 is the method of aspect 23, where the method further includes transmitting, for the UE, a network indication of the multiple PRG sizes.

Aspect 25 is the method of aspect 24, wherein the network indication is comprised in a cyclic redundancy check (CRC).

Aspect 26 is the method of any of aspects 23 to 25, wherein determining the multiple PRG sizes comprises: grouping, based on the characteristics associated with the set of RBs, the set of RBs into multiple RB groups each comprising one or more RB units adjacent to each other, each RB unit comprising one or more RBs of the set of RBs, wherein a difference between a first average value of the characteristics of all RB units in a first RB group of the multiple RB groups and a second average value of the characteristics of all RB units in a second RB group of the multiple RB groups is greater than a threshold; and setting, based on sizes of the multiple RB groups, the multiple PRG sizes.

Aspect 27 is the method of aspect 26, wherein the characteristics of an RB unit include an average power of all RBs in the RB unit.

Aspect 28 is the method of aspect 26, wherein each RB unit includes four RBs.

Aspect 29 is the method of any of aspects 24 to 28, transmitting the network indication of the multiple PRG sizes comprises: converting the multiple PRG sizes into a stream of binary bits, wherein each PRG size of the multiple PRG sizes occupies a first number of binary bits in the stream of binary bits; encoding the stream of binary bits using an encoding code to obtain an encoded stream; and transmitting, via downlink control information (DCI), the network indication of the multiple PRG sizes in the encoded stream.

Aspect 30 is the method of any of aspects 22 to 29, where the method further includes performing, based on the multiple PRG sizes, a precoding procedure to obtain the multiple precoding matrices for a downlink transmission with the UE, wherein each precoding matrix of the multiple precoding matrices is based on a concatenated channel matrix based on a corresponding PRG size of the multiple PRG sizes.

Aspect 31 is the method of aspect 30, wherein performing the precoding procedure comprises: performing, for each precoding matrix of the multiple precoding matrices, a singular value decomposition on the concatenated channel matrix, wherein the precoding matrix for the downlink transmission with the UE is based on a right eigenmatrix of the singular value decomposition of the concatenated channel matrix.

Aspect 32 is the method of any of aspects 22 to 31, where the method further includes receiving, from the UE, a capability indication for a capability to support the multiple PRG sizes.

Aspect 33 is the method of aspect 32, where the method further includes transmitting, for the UE in response to the capability indication, one or more parameters for the multiple PRG sizes, wherein the one or more parameters comprise one or more of: a minimum resolution for RB units in the set of RBs, a number of binary bits for transmitting each PRG size of the multiple PRG sizes, a length of cyclic redundancy check (CRC) corresponding to the multiple PRG sizes, or a code indication of an encoding code used for encoding a stream of bits representing the multiple PRG sizes.

Aspect 34 is an apparatus for wireless communication at a network entity, comprising: a processing system that includes processor circuitry and memory circuitry that stores code and is coupled with the processor circuitry, the processing system configured to cause the network entity to perform the method of one or more of aspects 22-33.

Aspect 35 is an apparatus for wireless communication at a network entity, comprising: at least one memory; and at least one processor coupled to the at least one memory and, where the at least one processor, individually or in any combination, is configured to perform the method of any of aspects 22-33.

Aspect 36 is the apparatus for wireless communication at a network entity, comprising means for performing each step in the method of any of aspects 22-33.

Aspect 37 is an apparatus of any of aspects 34-36, further comprising a transceiver configured to receive or to transmit in association with the method of any of aspects 22-33.

Aspect 38 is a computer-readable medium (e.g., a non-transitory computer-readable medium) storing computer executable code at a network entity, the code when executed by at least one processor causes the at least one processor to, individually or in any combination, perform the method of any of aspects 22-33.

What is claimed is:

1. An apparatus for wireless communication at a user equipment (UE), comprising:
- at least one memory; and
- at least one processor coupled to the at least one memory and, based at least in part on information stored in the at least one memory, the at least one processor is configured to cause the UE to:
  - group a set of resource blocks (RBs) of a slot into multiple physical resource block groups (PRGs) having multiple PRG sizes;
  - perform, based on the multiple PRG sizes, a precoding procedure to obtain multiple precoding matrices for an uplink transmission with a network entity, wherein each precoding matrix of the multiple precoding matrices is based on a concatenated channel matrix based on a corresponding PRG size of the multiple PRG sizes; and
  - communicate with the network entity based on the multiple precoding matrices respectively associated with the multiple PRGs having the multiple PRG sizes.

2. The apparatus of claim 1, further comprising a transceiver coupled to the at least one processor, wherein to communicate with the network entity, the at least one processor is configured to cause the UE to communicate with the network entity via the transceiver, and wherein the at least one processor is further configured to cause the UE to:
- receive, from the network entity via downlink channel information (DCI), a network indication of the multiple PRG sizes for the slot.

3. The apparatus of claim 1, wherein the at least one processor is further configured to cause the UE to:
- determine, based on characteristics associated with the set of RBs, the multiple PRG sizes for the slot.

4. The apparatus of claim 3, wherein the at least one processor is further configured to cause the UE to:
- transmit, for the network entity, a size indication of the multiple PRG sizes for the slot.

5. The apparatus of claim 4, wherein to transmit the size indication of the multiple PRG sizes, the at least one processor is configured to cause the UE to:
- convert the multiple PRG sizes into a stream of binary bits, wherein each PRG size of the multiple PRG sizes occupies a first number of binary bits in the stream of binary bits;
- encode the stream of binary bits using an encoding code to obtain an encoded stream; and
- transmit, via an uplink control information (UCI) message, the encoded stream indicating the multiple PRG sizes.

6. The apparatus of claim 5, wherein the at least one processor is further configured to cause the UE to:
- receive, from the network entity, one or more parameters for the multiple PRG sizes, wherein the one or more parameters comprise one or more of:
  - a minimum resolution for RB units in the set of RBs,
  - the first number of binary bits in the stream of binary bits for transmitting each PRG size of the multiple PRG sizes,
  - a length of cyclic redundancy check (CRC) corresponding to the multiple PRG sizes, or
  - a code indication of the encoding code used for encoding the stream of binary bits.

7. The apparatus of claim 3, wherein to determine the multiple PRG sizes, the at least one processor is configured to cause the UE to:
- group, based on the characteristics associated with the set of RBs, the set of RBs into multiple RB groups each comprising one or more RB units adjacent to each other, each RB unit comprising one or more RBs of the set of RBs, wherein a difference between a first average value of the characteristics of all RB units in a first RB group of the multiple RB groups and a second average value of the characteristics of all RB units in a second RB group of the multiple RB groups is greater than a threshold; and
- set, based on sizes of the multiple RB groups, the multiple PRG sizes.

8. The apparatus of claim 7, wherein the characteristics of an RB unit include an average power of all RBs in the RB unit.

9. The apparatus of claim 7, wherein each RB unit includes four RBs.

10. The apparatus of claim 3, wherein the at least one processor is further configured to cause the UE to:
- calculate a first cyclic redundancy check (CRC) based on an initial set of multiple PRG sizes determined for the slot; and
- receive, from the network entity via downlink control information (DCI), a second CRC based on a set of network determined PRG sizes, and wherein to determine the multiple PRG sizes, the at least one processor is further configured to cause the UE to:
- compare the first CRC to the second CRC.

11. The apparatus of claim 10, wherein the at least one processor is further configured to cause the UE to:
- apply, in response to a mismatch between the first CRC and the second CRC, a correction to the multiple PRG sizes, or estimate, in response to the mismatch between the first CRC and the second CRC, the multiple PRG sizes based on a reference signal.

12. The apparatus of claim 1, wherein to perform the precoding procedure, the at least one processor is configured to cause the UE to:

perform, for each precoding matrix of the multiple precoding matrices, a singular value decomposition on the concatenated channel matrix, wherein the precoding matrix for the uplink transmission with the network entity is based on a right eigenmatrix of the singular value decomposition of the concatenated channel matrix.

13. The apparatus of claim 1, wherein the at least one processor is configured to cause the UE to:

transmit, for the network entity, a capability indication for a capability to support the multiple PRG sizes.

14. The apparatus of claim 13, wherein the capability indication comprises one of:

a first support for receiving the multiple PRG sizes from the network entity, a second support for calculating the multiple PRG sizes at the UE in parallel with the network entity, or a third support for providing a size indication of the multiple PRG sizes from the UE to the network entity.

15. The apparatus of claim 1, wherein to communicate with the network entity, the at least one processor is configured to cause the UE to:

transmit or receive communication that is precoded based on the multiple PRGs that have different PRG sizes over a frequency domain of the communication.

16. An apparatus for wireless communication at a network entity, comprising:

at least one memory; and at least one processor coupled to the at least one memory and, based at least in part on information stored in the at least one memory, the at least one processor is configured to cause the network entity to:

group a set of resource blocks (RBs) of a slot into multiple physical resource block groups (PRGs) having multiple PRG sizes;

perform, based on the multiple PRG sizes, a precoding procedure to obtain multiple precoding matrices for a downlink transmission with a user equipment (UE), wherein each precoding matrix of the multiple precoding matrices is based on a concatenated channel matrix based on a corresponding PRG size of the multiple PRG sizes; and communicate with the UE based on the multiple precoding matrices respectively associated with the multiple PRGs.

17. The apparatus of claim 16, further comprising a transceiver coupled to the at least one processor wherein to communicate with the UE, the at least one processor is configured to cause the network entity to communicate with the UE via the transceiver, and wherein the at least one processor is configured to cause the network entity to:

determine, based on characteristics associated with the set of RBs, the multiple PRG sizes.

18. The apparatus of claim 17, wherein the at least one processor is further configured to cause the network entity to:

transmit, for the UE, a network indication of the multiple PRG sizes.

19. The apparatus of claim 18, wherein the network indication is comprised in a cyclic redundancy check (CRC).

20. The apparatus of claim 18, wherein to transmit the network indication of the multiple PRG sizes, the at least one processor is configured to cause the network entity to:

convert the multiple PRG sizes into a stream of binary bits, wherein each PRG size of the multiple PRG sizes occupies a first number of binary bits in the stream of binary bits;

encode the stream of binary bits using an encoding code to obtain an encoded stream; and transmit, via downlink control information (DCI), the network indication of the multiple PRG sizes in the encoded stream.

21. The apparatus of claim 17, wherein to determine the multiple PRG sizes, the at least one processor is configured to cause the network entity to:

group, based on the characteristics associated with the set of RBs, the set of RBs into multiple RB groups each comprising one or more RB units adjacent to each other, each RB unit comprising one or more RBs of the set of RBs, wherein a difference between a first average value of the characteristics of all RB units in a first RB group of the multiple RB groups and a second average value of the characteristics of all RB units in a second RB group of the multiple RB groups is greater than a threshold; and set, based on sizes of the multiple RB groups, the multiple PRG sizes.

22. The apparatus of claim 21, wherein the characteristics of an RB unit include an average power of all RBs in the RB unit.

23. The apparatus of claim 21, wherein each RB unit includes four RBs.

24. The apparatus of claim 16, wherein to perform the precoding procedure, the at least one processor is configured to cause the network entity to:

perform, for each precoding matrix of the multiple precoding matrices, a singular value decomposition on the concatenated channel matrix, wherein the precoding matrix for the downlink transmission with the UE is based on a right eigenmatrix of the singular value decomposition of the concatenated channel matrix.

25. The apparatus of claim 16, wherein the at least one processor is further configured to cause the network entity to:

receive, from the UE, a capability indication for a capability to support the multiple PRG sizes.

26. The apparatus of claim 25, wherein the at least one processor is further configured to cause the network entity to:

transmit, for the UE in response to the capability indication, one or more parameters for the multiple PRG sizes, wherein the one or more parameters comprise one or more of:

a minimum resolution for RB units in the set of RBs, a number of binary bits for transmitting each PRG size of the multiple PRG sizes, a length of cyclic redundancy check (CRC) corresponding to the multiple PRG sizes, or a code indication of an encoding code used for encoding a stream of bits representing the multiple PRG sizes.

27. The apparatus of claim 25, wherein the capability indication comprises one of:

a first support for receiving the multiple PRG sizes from the network entity, a second support for calculating the multiple PRG sizes at the UE in parallel with the network entity, or a third support for providing a size indication of the multiple PRG sizes from the UE to the network entity.

28. The apparatus of claim 16, wherein to communicate with the UE, the at least one processor is configured to cause the network entity to:

transmit or receive communication that is precoded based on the multiple PRGs that have different PRG sizes over a frequency domain of the communication.

29. A method of wireless communication at a user equipment (UE), comprising:

grouping a set of resource blocks (RBs) of a slot into multiple physical resource block groups (PRGs) having multiple PRG sizes;

performing, based on the multiple PRG sizes, a precoding procedure to obtain multiple precoding matrices for an uplink transmission with a network entity, wherein each precoding matrix of the multiple precoding matrices is based on a concatenated channel matrix based on a corresponding PRG size of the multiple PRG sizes; and communicating with the network entity based on the multiple precoding matrices respectively associated with the multiple PRGs having the multiple PRG sizes.

30. A method of wireless communication at a network entity, comprising:

grouping a set of resource blocks (RBs) of a slot into multiple physical resource block groups (PRGs) having multiple PRG sizes;

performing, based on the multiple PRG sizes, a precoding procedure to obtain multiple precoding matrices for a downlink transmission with a user equipment (UE), wherein each precoding matrix of the multiple precoding matrices is based on a concatenated channel matrix based on a corresponding PRG size of the multiple PRG sizes; and communicating with the UE based on the multiple precoding matrices respectively associated with the multiple PRGs.

* * * * *